US005483110A

United States Patent [19]
Koide et al.

[11] Patent Number: 5,483,110
[45] Date of Patent: Jan. 9, 1996

[54] SIGNAL TRANSMISSION METHOD, SIGNAL TRANSMISSION CIRCUIT AND INFORMATION PROCESSING SYSTEM USING SAME

[75] Inventors: Kazuo Koide, Iruma; Masao Mizukami, Yokohama; Satoshi Hososaka, Higashiyamato; Junya Kudoh, Tokyo, all of Japan

[73] Assignee: Hitachi, Ltd., Tokyo, Japan

[21] Appl. No.: 202,382

[22] Filed: Feb. 28, 1994

[30] Foreign Application Priority Data

| | | | |
|---|---|---|---|
| Mar. 19, 1993 | [JP] | Japan | 5-085428 |
| Sep. 9, 1993 | [JP] | Japan | 5-248740 |
| Nov. 29, 1993 | [JP] | Japan | 5-323291 |

[51] Int. Cl.$^6$ .................................................. H01B 11/12
[52] U.S. Cl. ........................... 307/147; 375/257; 379/90
[58] Field of Search .......................... 364/130; 327/544, 327/545; 379/90; 375/36; 307/407; 326/30; 266/281

[56] References Cited

U.S. PATENT DOCUMENTS 5,023,488  6/1991  Gunning .
5,355,391 10/1994  Horowitz et al. ................... 375/36
5,371,424 12/1994  Quigley et al. ..................... 326/63

OTHER PUBLICATIONS

Gunning, Bill, et al. "WP 3.7: A CMOS Low–Voltage–Swing Transmission–Line Transceiver," ISSCC (International Solid State Circuit Conference), Feb. 19, 1992, pp. 42–43 and 58–59. (provided in English).

Primary Examiner—William M. Shoop, Jr.
Assistant Examiner—Albert Paladini
Attorney, Agent, or Firm—Fay, Sharpe, Beall, Fagan, Minnich & McKee

[57] ABSTRACT

One paired wiring traveling in parallel to a transmission path of a signal and a transmission path of reference voltage is used, and a terminal end resistor matched with the characteristic impedance is installed, and in a receiving circuit connected thereto, a differential input circuit with offset set to about ½ of the terminal end voltage is used, and an output circuit of open drain is used in a transmitting circuit. A high-speed information processing section using such a bus circuit and a low-speed information processing section using a conventional low-speed bus are mutually connected through an interface circuit to construct the system hierarchically.

12 Claims, 14 Drawing Sheets

IN CASE OF GND REFERENCE

IN CASE OF VT REFERENCE

SIGNAL TRANSMISSION METHOD, SIGNAL TRANSMISSION CIRCUIT AND INFORMATION PROCESSING SYSTEM USING SAME

BACKGROUND OF THE INVENTION

The present invention relates to a signal transmission method, a signal transmission circuit and information processing system using the same, and mainly relates to effective technology to be utilized for a relatively short transmission path with a plurality of information processing sections connected thereto.

In an information processing apparatus such as a personal computer or a workstation, so-called bus circuit is used where a plurality of information processing sections are connected in parallel to one transmission path and transmission of information is carried out mutually. To realize consumption power reduction of the bus circuit, GTL (Gunning Transmission Logic) is used. The GTL as shown in FIG. 22, reduces signal amplitude on the bus line to a half or less in comparison with conventional TTL (transistor transistor logic) level and intends the consumption power reduction. That is, terminal end voltage Vt of the bus circuit is set such low voltage as 1.2 V, and in a receiving circuit Rcvr, a differential amplifier circuit capable of sensing a small signal is used in place of a usual logic circuit.

The above-mentioned GTL is disclosed in transaction of ISSCC (International Solid State Circuit Conference), Feb. 19, 1992, pp. 58–59.

SUMMARY OF THE INVENTION

In the above-mentioned GTL, since decision of a signal transmitted through a transmission path is effected by reference voltage Vref provided at input part of a differential circuit, even at amplitude reduction, influence of noise in the transmission path must be considered; therefore the limit is the above-mentioned voltage of about 1.2 V. Since characteristic impedance of a general transmission line is as small as $50\Omega$, there is a problem as clarified by the present inventors that the consumption power at the terminal end resistor RZ becomes as large as $2\times1.2^2/50=57.6$ mW even under the low voltage 1.2 V as above described.

An object of the present invention is to provide a signal transmission circuit which enables consumption power reduction and high speed.

Another object of the present invention is to provide a signal transmission circuit where in addition to the consumption power reduction and the high speed, enlargement of the operation margin is realized.

Another object of the present invention is to provide information processing system where information processing is realized with low consumption power and good efficiency.

The foregoing and other objects and novel features of the present invention will become apparent from the description of the specification and the accompanying drawings.

Outline of a representative invention disclosed in the present patent application will be briefly described as follows. A paired wiring traveling in parallel to a transmission path of a signal and a transmission path of reference voltage is used and a terminal end resistor matched with characteristic impedance of the transmission path of the signal is connected to the terminal end voltage, and the terminal end resistor matched with characteristic impedance of the transmission path of the reference voltage is connected to the above-mentioned terminal end voltage or the ground potential of the circuit, and in a receiving circuit connected thereto, an input stage circuit is used so that an amplifying transistor receiving the reference voltage of the transmission path utilizing the offset set to about ½ of the terminal end voltage and an amplifying transistor receiving the input signal inputted through the transmission path carry out differential operation, and a transmitting circuit is constituted to carry out signal transmission using an open drain output circuit.

According to the above-mentioned means, since the signal and the reference voltage are transferred through the transmission path, noises appear at the common mode therefore can be canceled in the differential input circuit, and since the reference voltage is constituted by the offset of the differential input circuit, the reference voltage can be set with high accuracy. Therefore the terminal end voltage is further made low voltage so as to enable the consumption power reduction and the high speed.

Outline of another representative invention disclosed in the present patent application will be briefly described as follows. A first wiring receiving terminal end voltage on both ends through a terminal end resistor, a second wiring installed in parallel to the first wiring and receiving the ground potential of the circuit on both ends through a terminal end resistor, a first semiconductor integrated circuit having an output circuit coupled with the first and second wirings, and a second semiconductor integrated circuit having an input circuit coupled with the first and second wirings are provided, where the output circuit uses a drive transistor arranged between the first wiring and the ground potential of the circuit and switch-controlled by an output signal and a switching transistor arranged between the second wiring and the ground potential of the circuit and switch-controlled in synchronization with ON/OFF state of the drive transistor, and the input circuit uses an input stage circuit so that an amplifying transistor supplied with the ground potential of the second wiring by the offset voltage set to about ½ of the terminal end voltage and an amplifying transistor supplied with the input signal transmitted from the first wiring carry out differential operation.

According to the above-mentioned means, the signal and the reference voltage are transferred through the transmission path and noises including output noise generated at the first semiconductor integrated circuit appear at the common mode therefore can be canceled by the differential input circuit, and since the reference voltage is constituted by the offset of the differential input circuit therefore the reference voltage can be set with high accuracy, in addition to the consumption power reduction and the high speed, enlargement of the operation margin is intended.

Outline of another representative invention disclosed in the present patent application will be briefly described as follows. A first wiring receiving terminal end voltage on both ends through a terminal end resistor, a second wiring installed in parallel to the first wiring and receiving the ground potential of the circuit on both ends through a terminal end resistor, a first semiconductor integrated circuit having an output circuit coupled with the first and second wirings, and a second semiconductor integrated circuit having an input circuit coupled with the first and second wirings are provided, where the output circuit uses a drive transistor arranged between the first wiring and the ground potential of the circuit and switch-controlled by an output signal, a switching transistor arranged between the ground potential of the circuit and the output terminal and switch-controlled in synchronization with ON/OFF state of the drive transistor and a coupling capacitor inserted between the output terminal and the second wiring, and the input circuit uses an input stage circuit so that an amplifying transistor supplied with the ground potential of the second wiring by the offset voltage set to about ½ of the terminal end voltage and an amplifying transistor supplied with the input signal transmitted from the first wiring carry out differential operation.

According to the above-mentioned means, since transmission of a signal is carried out with respect to the terminal end voltage, it is not affected by variation of the output signal at low level due to variation of the terminal end voltage, and since noises including output noise generated in the first semiconductor integrated circuit appear at the common mode therefore can be canceled in the differential input circuit, in addition to the consumption power reduction and the high speed, further enlargement of the operation margin is intended.

Outline of still another representative invention disclosed in the present patent application will be briefly described as follows. A paired wiring traveling in parallel to a transmission path of a signal and a transmission path of reference voltage is used, and a terminal end resistor matched with the characteristic impedance of the transmission path of the signal is connected to the terminal voltage and a terminal end resistor matched with the characteristic impedance of the transmission path of the reference voltage is connected to the terminal end voltage or the ground potential of the circuit, and in a receiving circuit connected thereto, an input stage circuit is used so that an amplifying transistor receiving the reference voltage of the transmission path utilizing the offset set to about ½ of the terminal end voltage and an amplifying transistor receiving the input signal inputted through the transmission path carry out differential operation, and in a transmitting circuit, a high speed information processing section by a bus circuit using an open drain output circuit and a low speed information processing section using a conventional low speed bus are connected to each other through an interface circuit to constitute the system hierarchically.

According to the above-mentioned means, a high speed information processing section using a bus circuit capable of making the transmission speed high by amplitude reduction of the transmitted signal and a conventional low speed bus circuit are combined so that efficient information processing in response to respective signal transmission speeds can be carried out.

DESCRIPTION OF THE PREFERRED EMBODIMENTS

Figure 1:
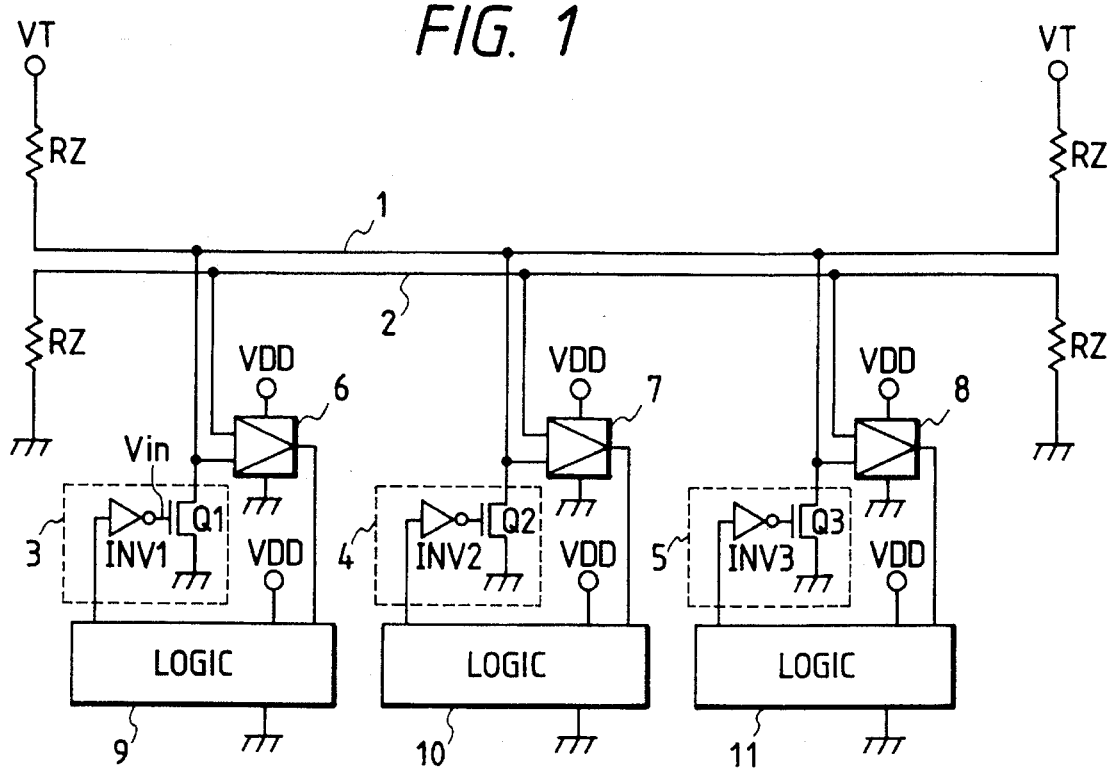
FIG. 1 is a circuit diagram showing an embodiment of a signal transmission circuit (bus circuit) according to the invention.

FIG. 1 shows a circuit diagram of an embodiment of a signal transmission circuit (bus circuit) according to the present invention. In FIG. 1, signal transmission paths (bus lines) 1 and 2 are formed in a package substrate with electronic devices including a semiconductor integrated circuit device mounted thereon or a semiconductor integrated circuit of large scale. Since bus circuits in general intend to transfer signals of plural bits in parallel, a plurality of signal transmission paths are installed corresponding to this, and in FIG. 1, a circuit corresponding to a signal of one bit among those is exemplified as representative. A circuit to transfer a signal in serial is constituted, of course, by one (a pair) transmission path as shown in FIG. 1.

On both ends of the bus line 1 to transmit signals, a terminal end resistor RZ having resistance value matched with the characteristic impedance is connected between the line and terminal end voltage VT. The terminal end voltage VT is set to considerable low voltage, for example 0.8 V, in comparison with power supply voltage VDD of input/output circuits in information processing circuits (hereinafter referred to simply as "LOGIC") 9–11 connected to the bus circuit for reducing its power consumption. In the power supply voltage VDD of the input/output circuit in the LOGIC, power supply voltage such as 5 V or 3.3 V for a conventional CMOS integrated circuit is used.

An output circuit (transmitting circuit) 3 installed at a LOGIC 9, such as a circuit enclosed by dotted line in FIG. 1, is constituted by an inverter circuit INV1 and an N-channel type MOSFET Q1 of open drain driven by the inverter circuit INV1. Drain of the MOSFET Q1 is connected to the bus line 1. Output circuits 4, 5 installed at other LOGICs 10, 11 are constituted by inverter circuits INV2, INV3 and N-channel type MOSFETs Q2, Q3 similar to those as above described, and drains as output terminals are suitably connected to the bus line 1. By connection in parallel form to the bus line 1 using the output MOSFETs Q1–Q3 in such open drain constitution, an output signal of wired-OR logic can be sent. In the present patent application, MOSFET is used in meaning of an insulation gate type field effect transistor (IGFET).

An input circuit (receiving circuit) 6 installed at the LOGIC 9 is constituted by a differential input circuit as shown by a black box in FIG. 1. One input of the differential input circuit 6 is made common to the output terminal of the output circuit and connected to the bus line 1. To other input of the differential input circuit 6 is supplied the ground potential as reference voltage through a bus line 2. The bus line 2 is formed on a semiconductor integrated circuit or a package substrate so as to travel in parallel to the bus line 1 for signal transmission, and the terminal end of the bus line 2 is connected to the ground potential through a terminal end resistor RZ similar to the terminal end resistor RZ of the bus line 1.

Input circuits 7, 8 installed at other LOGICs 10, 11 are constituted by differential input circuits similar to those as above descried, and the ground potential as reference voltage is supplied through the bus line 2 traveling in parallel to the bus line 1.

The reference voltage of the differential input circuits 6–8 is reference voltage to discriminate high level/low level of a signal received through the bus line 1. In the output circuit as above describe, when the output MOSFET is at the OFF-state, high level (0.8 V) is outputted by the terminal end resistor RZ, and when the output MOSFET is at the ON-state, low level of nearly 0 V is outputted. Consequently, when usual differential input circuit is used and moreover the ground potential of the circuit is supplied as the reference voltage, discrimination of high level/low level of the signal as above described is impossible.

In this embodiment, while the ground potential of the circuit is used as the reference voltage of the differential input circuit, offset is set in the differential input circuit in order to carry out the discrimination operation of high level/low level as above described. That is, the offset of about 0.4 V being nearly intermediate potential of the high level/low level is provided. More specifically, the offset voltage is provided so that the input terminal side with the reference voltage supplied thereto becomes 0.4 V. By setting of such offset voltage, if high level such as 0.8 V is inputted in the differential input circuit, since it follows that the input signal such as 0.4 V is relatively supplied to the reference voltage by adding the offset component to the ground potential of the circuit, decision is effected that it is at high level. If low level such as 0 V is inputted, since it follows that the input signal such as −0.4 V is relatively supplied to the reference voltage by adding the offset component to the ground potential of the circuit, decision is effected that it is at low level.

The LOGICs 9–11 are a high-speed processor unit of high performance, a high-speed memory device, or an interface circuit or an input/output control unit or the like in an information processing apparatus such as a workstation, a personal computer or the like as hereinafter described.

When any of the output circuits 3–5 of the LOGICs 9–11 is not operated, the potential of the bus line 1 becomes 0.8 V being the same as the terminal end voltage VT therefore the current consumption is not carried out. The bus line 2 is at the ground potential of the circuit.

For example, if the output circuit 3 is selected and the output MOSFET Q1 is turned on in response to the transmission data formed by the LOGIC 9, the potential of the bus line 1 is reduced to nearly the ground potential of the circuit. In this embodiment, each of the differential input circuits 7, 8 of other LOGICs 10, 11 receiving signals sent through the bus line 1 has one input terminal connected to the bus line 1 side, and other input terminal corresponding to the reference voltage terminal is terminated to the ground potential and connected to the bus line (reference line) 2 traveling in parallel to the bus line 1.

Consequently, when noise appears on the bus line 1, similar noise appears also on the bus line 2 traveling in parallel to the line 1. As a result, for example, when the differential input circuit 7 is selected and signal reception is carried out, noise components on the bus lines 1 and 2 become the common mode and can be canceled in the differential input circuit. Thus, in spite of the amplitude reduction of the signal on the bus line 1 as above described, since influence of external noise is reduced significantly, sufficient level margin of the signal can be secured.

Substantial reference voltage of the differential input circuit utilizes offset of the differential input circuit. By utilizing the offset of such a differential input circuit, the reference voltage can be set with high accuracy. In this connection, in a sense amplifier of differential input installed at a dynamic type RAM (random access memory), input offset can be suppressed to about 10 mV. That is, in the semiconductor manufacturing technology, it means that the input offset can be controlled with accuracy of 10 mV. In the sense amplifier of the dynamic type RAM, process control is carried out so that offset becomes small, and it means that offset of 40 mV as above descried can be set with high accuracy by the same process technology. By setting the reference voltage utilizing the offset of the differential input circuit as above described, advantage is produced in that the constant-voltage circuit to form the reference voltage in the receiving circuit can be omitted.

In the signal transmission circuit as above described, the signal amplitude can be reduced to about 0.8 V or less and the consumption power of the terminal end resistor RZ even using the bus line of 50Ω can be reduced to such as $2 \cdot VT^2/RZ = 2 \times 0.8^2/50 = 25.6$ mW thus to a half in comparison to the GTL as above described. If the terminal end voltage VT is set further lower to such as 0.5 V, the consumption power at the terminal end resistor RZ becomes 10 mW thus reduction of the power consumption can be further intended.

The consumption power reduction does not only mean that the energy consumption becomes small. In the semiconductor integrated circuit device, the current consumption means that it brings the heat generation. Consequently, if the consumption current becomes small in the semiconductor integrate circuit device, since the heat generation becomes small, it results in that the large scale integration becomes possible under the same package or mounting means (cooling means), and also results in that the mounting means can be simplified if the circuit scale is the same. In a portable information processing apparatus driven by a cell, it results in that the cell life can be lengthened by the consumption power reduction.

Figure 2:
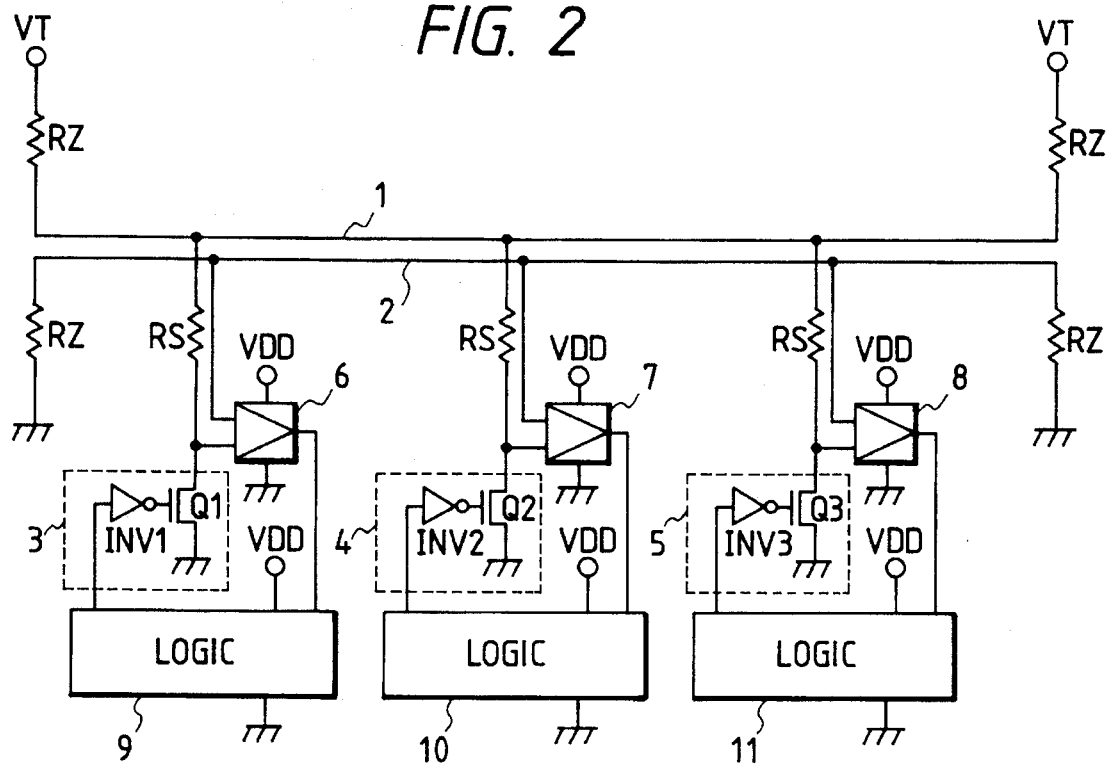
FIG. 2 is a circuit diagram showing another embodiment of a signal transmission circuit according to the invention.

FIG. 2 shows a circuit diagram of another embodiment of a signal transmission circuit according to the present invention. A signal transmission path in FIG. 2 similarly to the embodiment in FIG. 1, is formed in a package substrate such as a print circuit board on which an electronic device including a semiconductor integrated circuit device is mounted or in a semiconductor integrated circuit of large scale. Except for parts hereinafter descried, since this embodiment is similar to the embodiment in FIG. 1, the description shall be omitted.

In this embodiment, a series resistor RS is inserted between drain of a MOSFET Q1 being an output terminal of an output circuit 3 and joint of a bus line 1. Similar series resistors RS are installed also in other output circuits 4 and 5.

These series resistors RS reduce influence of output capacitor (parasitic capacitor) of the output circuits 3–5 connected thereto viewing from the side of the bus line 1, and prevents the characteristic impedance of the bus line 1 from being lowered locally at the joint of the output circuits 3–5. Thus, distortion of waveform due to reflection during high speed operation is decreased.

Figure 3A:
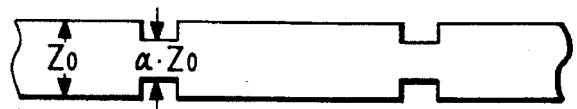
FIG. 3(A) and 3(B) are concept diagrams explaining characteristic impedance of a bus line 1 in FIG. 2.
Figure 3B:
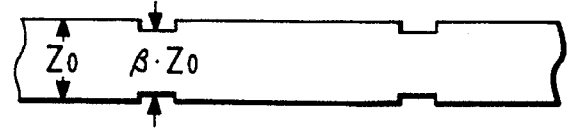

FIG. 3 shows a concept diagram explaining the characteristic impedance of the bus line 1. In FIG. 3, how the characteristic impedance Zo varies with respect to the length direction of the bus line 1 can be seen from the width. At the joint of the output circuit 3 or the like, it is disturbed due to influence of the output capacitor CA of the output circuit. When inductance per unit length is made L and capacitance per unit length is made C, the characteristic impedance Zo of the line in the case of neglecting the loss can be estimated by following formula (1).

$$Zo=(L/C)^{1/2} \quad (1)$$

At a portion to which the output circuit is connected, since the output capacitor CA is connected, the characteristic impedance Zo can be expressed by following formula (2).

$$\alpha \cdot Zo=[L/(C+CA)]^{1/2} \quad (2)$$

On the contrary, the series resistor RS is connected as above descried, the output capacitor CA is not connected intact but is reduced to $\gamma \cdot CA$. $\gamma$ is attenuation factor ($\gamma<1$). As a result, due to insertion of the series resistor RS, improvement shown by following formula (3) can be made.

$$\beta \cdot Zo=[L/(C+\gamma \cdot CA)]^{1/2} \quad (3)$$

In the above-mentioned formulas (1)–(3), since relation is in $\alpha<\beta<1$, the disturbance of the characteristic impedance can be improved from (A) to (B) as shown in FIG. 3.

According to the improvement of the disturbance of the characteristic impedance, voltage reflection generated corresponding to difference of the characteristic impedance becomes small and waveform distortion of signals transmitted on the bus line 1 becomes little, and the signals can be transmitted accurately at high speed.

Figure 4:
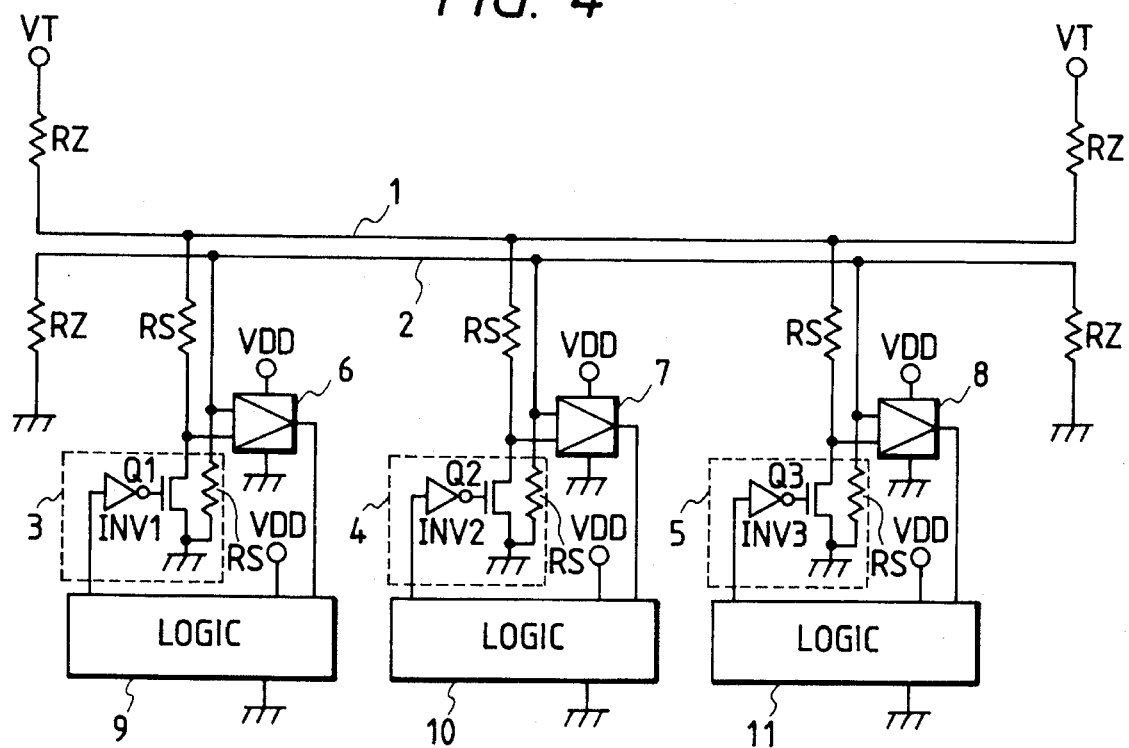
FIG. 4 is a circuit diagram showing another embodiment of a signal transmission circuit according to the invention.

FIG. 4 shows a circuit diagram of another embodiment of a signal transmission circuit according to the present invention. A signal transmission path in FIG. 4 similarly to the embodiments in FIG. 1 and FIG. 2, is formed in a package substrate such as a print circuit board on which an electronic device including a semiconductor integrated circuit device is mounted or in a semiconductor integrate circuit of large scale. Except for parts hereinafter descried, since this embodiment is similar to the embodiments in FIG. 1 and FIG. 2, the description shall be omitted.

In this embodiment, a series resistor RS similar to that as above descried is connected between an input terminal of reference voltage of a differential input circuit 6 and the ground potential of the circuit. Also in other differential input circuits 7 and 8, similar series resistors RS are installed. When an output circuit 3 is selected and a signal is sent to a bus line 1, in response to the ON-state of an output MOSFET Q1, noise is generate on the ground potential of the circuit. This noise is sent to the bus line 1 through the series resistor RS. In order that the noise generated in the selected output circuit 3 is also canceled in the differential input circuit at the reception side, the series resistor RS is inserted between the input terminal at the reference voltage side of the differential input circuit 6 and the ground potential of the circuit. Thus, the noise generated due to the ON-state of the output MOSFET Q1 of the output circuit 3 is sent also to the side of the bus line 2 through the series resistor RS, and can be canceled or reduced in the differential input circuit 7 or 8 at the reception side receiving it.

Figure 5:
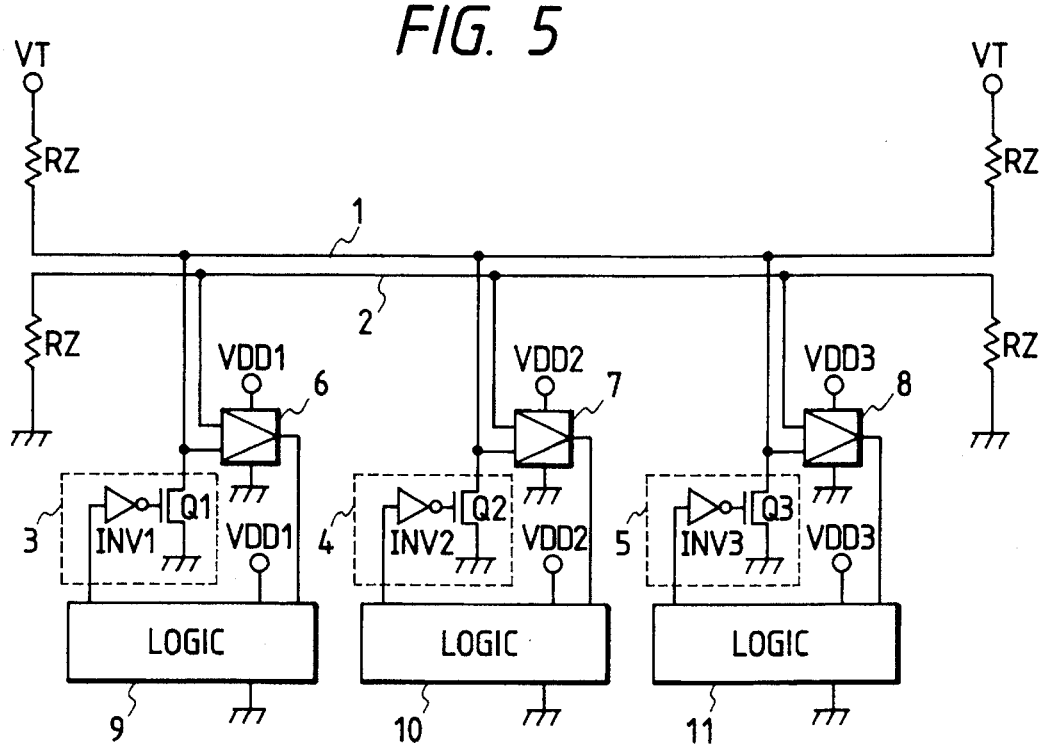
FIG. 5 is a circuit diagram showing another embodiment of a signal transmission circuit according to the invention.

FIG. 5 shows a circuit diagram of another embodiment of a signal transmission circuit according to the present invention. A signal transmission path in FIG. 5 similarly to the embodiment in FIG. 1, is formed in a package substrate such as a print circuit board on which an electronic device including a semiconductor integrated circuit device is mounted or in a semiconductor integrated circuit of large scale. Except for parts hereinafter described, since this embodiment is similar to the embodiment in FIG. 1, the description shall be omitted.

In this embodiment, respective power supply voltage of LOGIC 9, LOGIC 10 and LOGIC 11 are made VDD1, VDD2 and VDD3 being different from each other. Corresponding to the LOGIC 9–LOGIC 11, power supply voltages of differential input circuits 6, 7 and 8 are also made VDD1, VDD2 and VDD3 being different from each other.

Although not particularly limited thereto, the power supply voltage VDD1 is made voltage such as 5 V, the power supply voltage VDD2 is made voltage such as 3.3 V and the power supply voltage VDD3 is made voltage such as 2 V. For example, the LOGIC 9 is constituted by a CMOS circuit or a Bi-CMOS circuit operated by 5 V. The LOGIC 10 and the LOGIC 11 are constituted by CMOS circuits.

Even when the system is constituted by different power supply voltages VDD1–VDD3 as above described, since the output circuit is in open drain constitution and definite transmission signal level is set by the terminal end voltage VT, no problem is produced. Also the input circuit is constituted by a differential input circuit, and since the operation voltage is made the power supply voltages VDD1–VDD3 of the corresponding LOGIC 9–LOGIC 11 thereby level decision and amplification of above-mentioned signals are carried out, no problem is produced.

Thereby LOGIC constituted by a semiconductor integrated circuit device with different power supply voltages or an information processing circuit formed on a package substrate can be used in mixed state. Thus in this embodiment, advantage is brought in that the most suitable one is selected among existing semiconductor integrated circuit device or an information processing circuit constituted on a package substrate, and one information processing system can be constituted.

Figure 6:
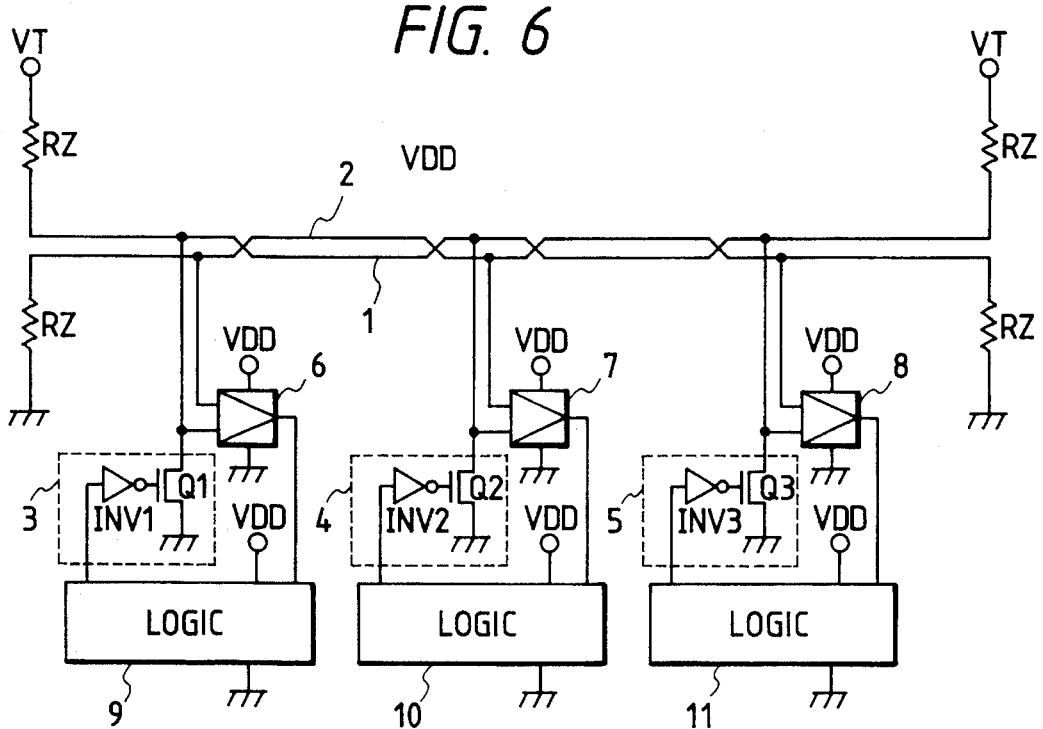
FIG. 6 is a circuit diagram showing another embodiment of a signal transmission circuit according to the invention.

FIG. 6 shows a circuit diagram of another embodiment of a signal transmission circuit according to the present invention. A signal transmission path in FIG. 6 similarly to the embodiment in FIG. 1, is formed in a package substrate such as a print circuit board on which an electronic device including a semiconductor integrated circuit device is mounted or in a semiconductor integrated circuit of large scale. Except for parts hereinafter described, since this embodiment is similar to the embodiment in FIG. 1, the description shall be omitted.

In this embodiment, a pair of bus lines 1 and 2 constituted in parallel traveling are arranged in crossing with suitable intervals. Thus, induced noises appearing on the bus lines 1 and 2 can be canceled. Also when plural pairs of bus lines are constituted traveling in parallel on a semiconductor integrated circuit or a package substrate such as a print circuit board, in every other pair of bus lines, the bus lines are transposed (crossing) as shown in this embodiment; thereby such state can be prevented that different coupling noises are produced due to parasitic capacitance between neighboring signals. That is, a pair of bus lines 1, 2 arranged neighboring at lateral side with respect to the bus lines 1, 2 of this embodiment are arranged without crossing. In bus lines arranged on the outside of a pair of bus lines arranged linearly as above described, transposition is carried out at regular intervals as above described.

Figure 7:
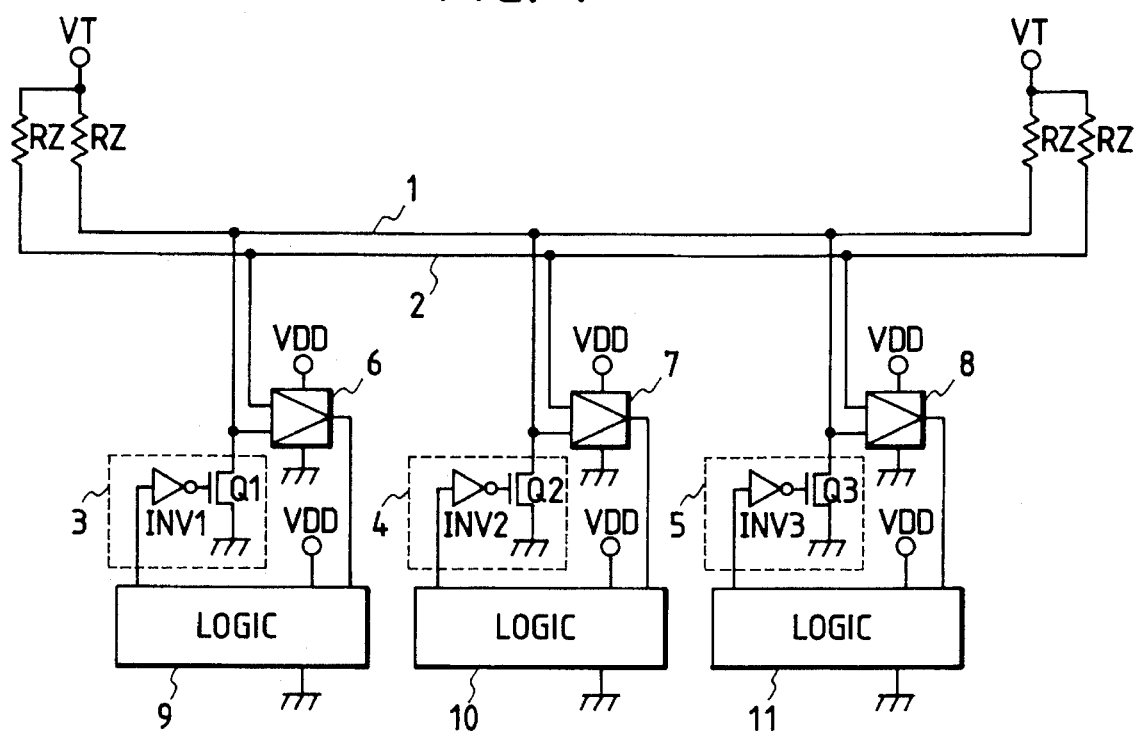
FIG. 7 is a circuit diagram showing still another embodiment of a signal transmission circuit according to the invention.

FIG. 7 shows a circuit diagram of still another embodiment of a signal transmission path according to the present invention. A signal transmission path in FIG. 7 similarly to the embodiment in FIG. 1, is formed in a package substrate such as a print circuit board on which an electronic device including a semiconductor integrated circuit device is mounted or in a semiconductor integrated circuit of large scale. Except for parts hereinafter descried, since this embodiment is similar to the embodiment in FIG. 1, the description shall be omitted.

In this embodiment, on both ends of a bus line 2 to transmit the ground potential as reference voltage, a terminal resistor RZ is installed between it and the terminal end voltage VT similarly to a bus line 1 for signal transmission.

In this constitution, in differential input circuits 6–8, offset voltage is provided so that the input terminal side with the reference voltage supplied thereto becomes –0.4 V. By setting of such offset voltage, if high level such as 0.8 V is inputted in the differential input circuits, since it follows that the input signal such as +0.4 V is supplied by subtracting the offset component from the terminal end voltage VT, decision is effected that it is at high level. If low level such as 0 V is inputted, since it follows that the input signal such as –0.4 V is supplied by subtracting the offset component from the terminal end voltage VT, decision is effected that it is at low level.

In this constitution, since noise appearing on the terminal end voltage VT is supplied to the differential input circuits at the common mode, the power supply noise can be canceled in the differential circuits. Consequently, when noise produced at the terminal end voltage VT is far from negligible, adopting the constitution in this embodiment becomes advantageous for securing the signal level margin.

Figure 8:
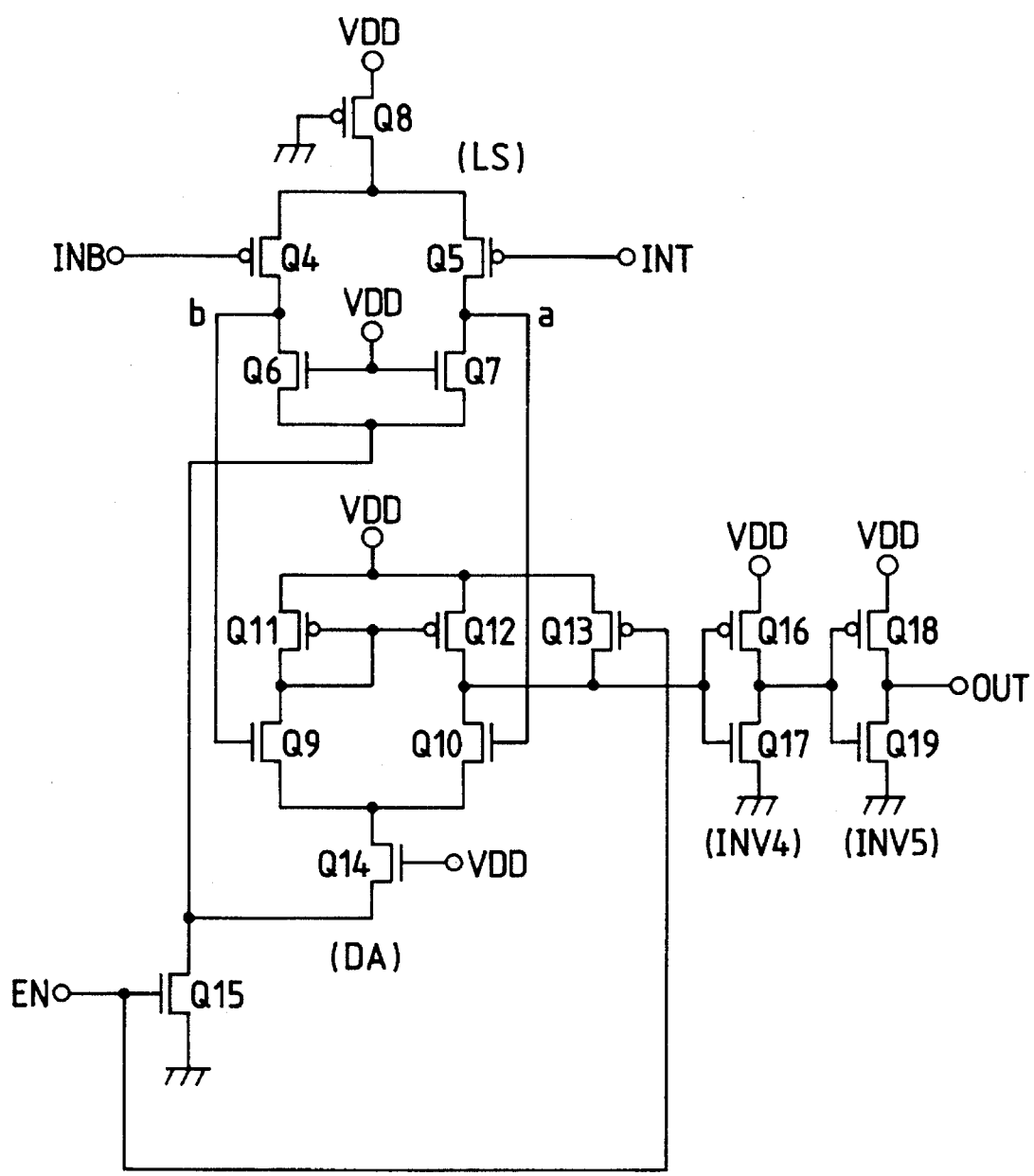
FIG. 8 is a circuit diagram showing an embodiment of a differential input circuit according to the invention.

FIG. 8 shows a circuit diagram of an embodiment of a differential input circuit used in a receiving circuit. Each circuit element in FIG. 8 is formed, together with other circuits where at least LOGIC or an output circuit is formed, on one semiconductor substrate such as monocrystalline silicon by known manufacturing technology of a CMOS integrated circuit.

In this embodiment, the signal level transmitted through the bus circuit is deviated to the low level side such as 0.8 V/0 V. Therefore the input stage of the differential input circuit is constituted by a differential circuit using P-channel type differential MOSFETs Q4 and Q5. P-channel type MOSFET Q8 is installed between common source of the P-channel type differential MOSFETs Q4 and Q5 and the power supply voltage VDD. The MOSFET Q8 is supplied at its gate with the ground potential of the circuit steadily, and operates as the constant power supply.

At drains of the P-channel type differential MOSFETs Q4 and Q5 are installed N-channel type load MOSFETs Q6, Q7. These N-channel type load MOSFETs Q6, Q7 are supplied at their gate with the power supply voltage VDD steadily thereby act as the resistor element.

The differential input circuit carries out amplification operation and also level shift operation. Together with the amplification operation corresponding to the conductance ratio of the MOSFETs Q4 an Q6 and the MOSFETs Q5 and Q7, the signal level is shifted from the ground side of the circuit to the power supply voltage VDD side. Thus, the input stage circuit has role as a level shift circuit (LS). Then the differential MOSFETs Q4 and Q5 have ratio of conductance, or the load MOSFETs Q6 and Q7 have ratio of conductance, or these are combined, thereby the offset used substantially as the reference voltage as above described can be set.

The paired element such as the differential MOSFET and the load MOSFET as above described can set the offset such as 400 mV as above described with high accuracy such as 10 mV, as the relative dispersion becomes small.

Output signals b and a passing through the level shift circuit (LS) as above described are supplied to gates of N-channel type differential MOSFETs Q9 and Q10. According to such level shift action, the signal level subjected to level deviation extremely to the ground potential side of the circuit viewing from the power supply voltage VDD can be operated at the most sensitive region of the differential amplification MOSFETs Q9 and Q10.

P-Channel type MOSFETs Q11 and Q12 in current mirror form are installed as an active load circuit at drains of the differential MOSFETs Q9 and Q10. N-channel type MOSFET Q14 is installed at common emitter of the N-channel type MOSFETs Q9 and Q10. The MOSFET Q14 is supplied at its gate with the power supply voltage VDD steadily thereby acts as the constant-current source. A differential amplifier circuit (DA) is constituted by the above-mentioned circuit.

In the differential input circuit comprising the level shift circuit (LS) and the differential amplifier circuit (DA) as above described, in order that only a circuit corresponding to the selected receiving circuit is operated, N-channel type MOSFET Q15 switch-controlled by a selective signal EN is installed at the load MOSFETs Q6, Q7 of the level shift circuit (LS) and the N-channel type MOSFET Q14 acting as the constant-current source. The MOSFET Q15 activates only the selected differential input circuit which acts as the power supply switch. Thus, the DC current does not flow steadily in the differential input circuit, and the consumption power reduction can be intended.

In order to prevent the output signal from becoming indefinite level when the differential input circuit is at non-selective state, in other words, in order to fix the differential amplification output signal to high level such as the power supply voltage VDD when the differential input circuit is at nonselective state, P-channel type MOSFET Q13 is installed between the output terminal of the differential amplifier circuit (DA) and the power supply voltage VDD, and the selective signal EN is supplied to its gate. When the selective signal EN is made low level thereby the differential input circuit is at non-selective state, the P-channel type MOSFET Q13 is turned on and the output signal of the differential amplifier circuit (DA) can be fixed to high level such as the power supply voltage VDD.

An output signal of the differential amplifier circuit (DA) passes through a CMOS inverter circuit comprising P-channel type MOSFET Q16 and N-channel type MOSFET Q17 and a CMOS inverter circuit comprising P-channel type MOSFET Q18 and N-channel type MOSFET Q19, and is made CMOS level and fetched as an input signal of the LOGIC.

The offset of the differential input circuit as above described may be that realized by conductance ratio of the differential MOSFETs Q9 and Q10 or conductance ratio of the load MOSFETs Q11 and Q12 or combination of these in the differential amplifier circuit (DA).

Further, the offset of the first stage may be provided by the level shift circuit, and the offset of the second stage may be provided by the differential amplifier circuit (DA), and the relatively large offset as above descried may be provided by combination of both. In this constitution, since the relatively large offset can be set dividing in the two stages, relative dispersion of a paired element can be decreased.

Figure 9:
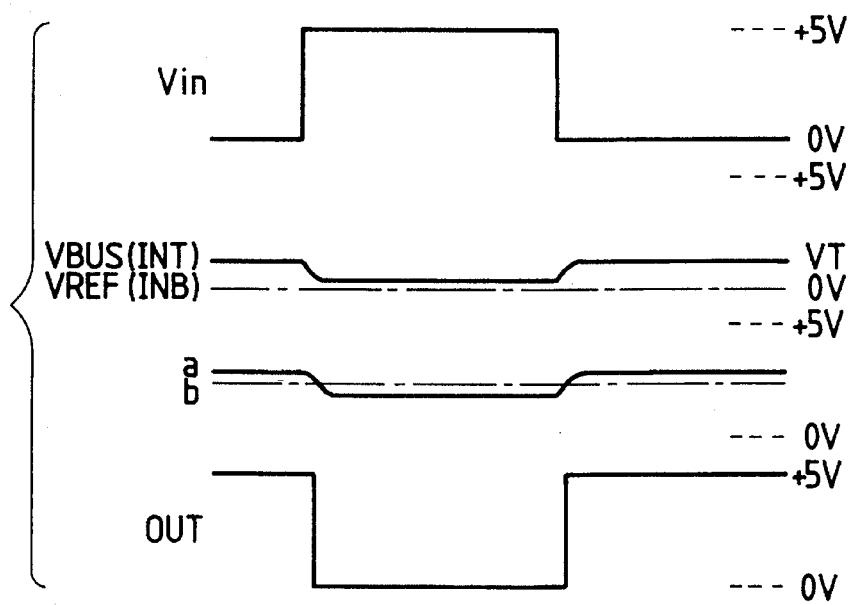
FIG. 9 is a waveform chart explaining an example of operation of the circuit of the embodiment in FIG. 1.

FIG. 9 shows a waveform chart explaining an example of operation of the signal transmission circuit as shown in FIG. 1. In this embodiment, the case using the power supply voltage VDD being voltage such as +5 V is exemplified.

Input signal Vin supplied to the gate of the output MOSFET Q1 of the output circuit is a signal of 5 V amplitude corresponding to the power supply voltage VDD of the LOGIC1. When the signal Vin to be outputted is at high level, the N-channel MOSFET Q1 is turned on and low level nearly the ground potential of the circuit is outputted to the bus line 1. In actual fact, since also the MOSFET Q1 has the ON-resistance value, low level is determined by the terminal end resistor RZ and the ON-resistance value of the MOSFET Q1, but the ON-resistance value of the MOSFET Q1 is made sufficiently small in comparison with the terminal end resistor RZ; thereby it can be made low level nearly the ground potential of the circuit.

Corresponding to the low level and the terminal end voltage VT as above described, a signal with level deviated to the ground potential side of the circuit viewing from the power supply voltage VDD is transmitted through the bus line 1. In the level shift circuit to which such signal level VBUS and the ground potential VREF as reference voltage are inputted, corresponding to the conductance ratio of the input MOSFET and the load MOSFET, the level shift operation and the above-mentioned offset are provided at the intermediate potential of the ground potential 0 V of the circuit and the power supply voltage +5 V. That is, in the input circuit receiving the reference voltage VREF, the level shift amount is relatively increased about 400 mV with respect to the input signal VBUS.

Conductance of the differential MOSFETs Q4, Q5 and the load MOSFETs Q6, Q7, in other words, size ratio of MOSFET is selected, thereby means for providing difference in the above-mentioned level shift amount can be realized easily with high accuracy. As an example providing the offset as shown in FIG. 9, when the MOSFETs Q4 and Q5 have the same conductance, conductance of the MOSFET Q6 may be set small in comparison with the MOSFET Q7. That is, size of the MOSFET Q6 may be formed smaller than that of the MOSFET Q7.

According to the offset and the level shift operation as above described, the output signals a and b are in that the signal a transmitted with respect to the voltage b is varied in high level/low level in the vicinity of nearly the middle point potential of the power supply voltage VDD. Receiving this, since the differential amplifier circuit (DA) carries out the amplification operation at the operation region of high sensitivity, the decision of high level/low level is effected and conversion to a signal of CMOS level such as +5 V/0 V is carried out through the output circuit comprising the CMOS inverter circuit as above describe and the signal can be fetched to the mounted LOGIC.

Figure 10:
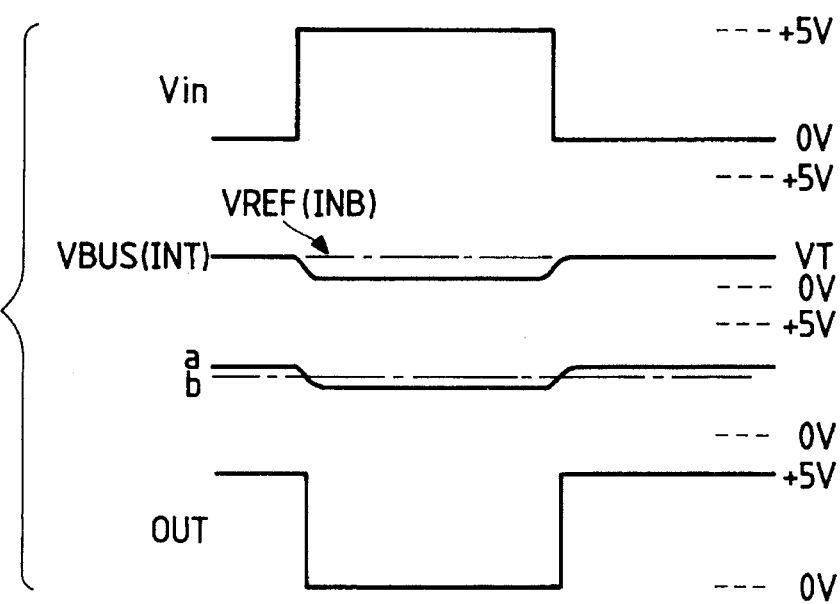
FIG. 10 is a waveform chart explaining an example of operation of the circuit of the embodiment in FIG. 7.

FIG. 10 shows a waveform chart explaining an example of operation of the signal transmission circuit as shown in FIG. 7. In this embodiment, the case using the power supply voltage VDD being voltage such as +5 V is exemplified.

In this embodiment, in response to that the terminal end resistor RZ of the bus line 2 at the reference potential side is connected to the side of the terminal end voltage VT, the reference voltage transmitted through the bus line 2 is made voltage corresponding to VT. Thus, in the differential input circuit as shown in FIG. 8, as an example providing difference in the level shift amount reverse to the case of FIG. 9, when the MOSFETs Q4 and Q5 have the same conductance, conductance of the MOSFET Q6 may be set large in comparison with the MOSFET Q7. That is, size of the MOSFET Q6 may be formed larger than that of the MOSFET Q7.

Thus, the level shift amount of the input signal VBUS is relatively made larger than that of the reference voltage VREF. The output signals a and b of the level shift circuit are in that the signal a transmitted with respect to the voltage b is varied in high level/low level in the vicinity of nearly the middle point potential of the power supply voltage VDD. Receiving this, since the differential amplifier circuit (DA) carries out the amplification operation at the operation region of high sensitivity, the decision of high level/low level is effected and conversion to a signal of CMOS level such as +5 V/0 V is carried out through the output circuit comprising the CMOS inverter circuit as above described an the signal can be fetched to the mounted LOGIC.

In the embodiment of FIG. 1, when a number of output circuits are operated and switching noise produced during simultaneous outputting of multi bits becomes far from negligible to the signal level being low amplitude as above described, a problem is produced in that the operation margin is deteriorated. Consequently, as shown in the embodiment of FIG. 4, noise produced due to the ON-state of the output MOSFET Q1 of the output circuit 3 is transmitted also to the side of the bus line 2 through the series resistor RS and can be canceled or reduced in the differential input circuit 7 or 8 at the reception side receiving it.

In the constitution of FIG. 4, however, there exist three or more LOGICs to be connected to the bus lines 1 and 2. For example, when signal transmission is carried out between two LOGICs 9 and 10, if signal processing is carried out by the inner circuit in other LOGIC 11 or the like, a problem is produced in that noise produced by the signal transmission operation appears through the bus line 2.

Figure 11:
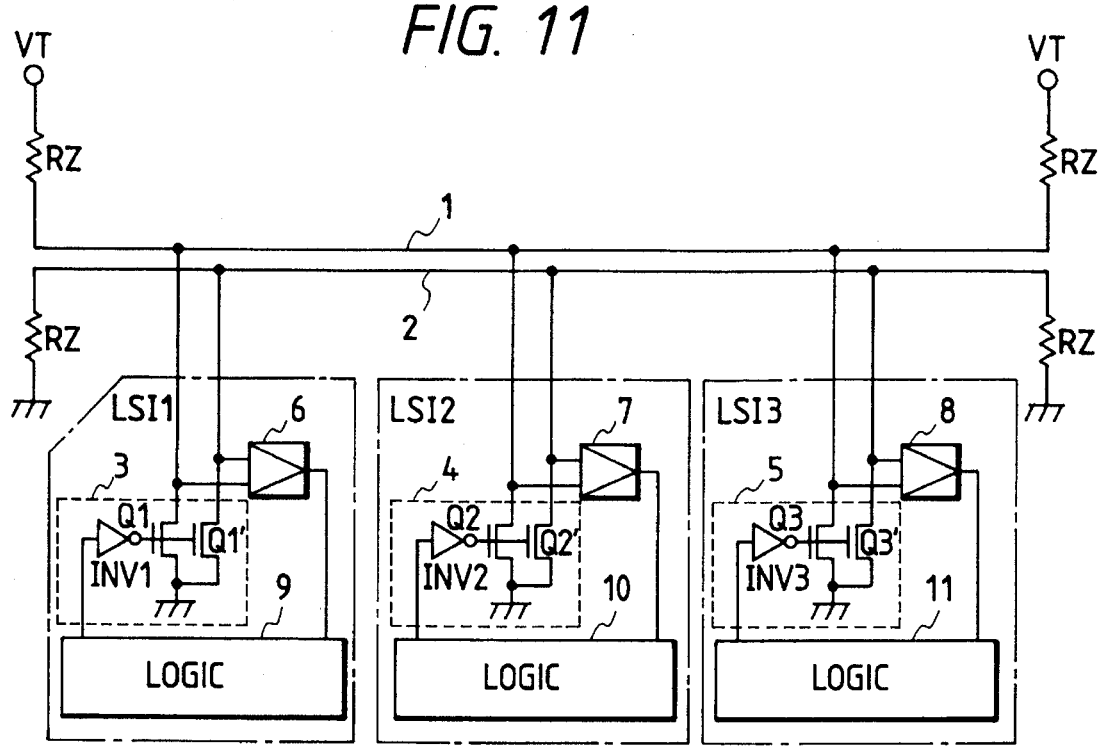
FIG. 11 is a circuit diagram showing still another embodiment of a signal transmission circuit according to the invention.

FIG. 11 shows a circuit diagram of still another embodiment of a signal transmission circuit according to the present invention. A signal transmission path in FIG. 11 similarly to the embodiment in FIG. 1, is formed in a package substrate such as a print circuit board on which an electronic device including a semiconductor integrated circuit device is mounted or in a semiconductor integrated circuit of large scale.

In FIG. 11, circuit constitution of one bit included in a bus of plural bits is exemplified, and a reference line 2 traveling in parallel to the signal line 1 of one bit is installed and both ends of the signal line 1 and the reference line 2 are terminated by terminal end resistors RZ each having value equal to the characteristic impedance of the line. In this embodiment, terminal end voltage VT of the signal line 1, although not particularly limited thereto, is made 0.8 V lower than +1.2 V in a GTL bus circuit in the prior art. The reference line 2 is terminated to the ground potential GND. LS11–LS13 designate a plurality of semiconductor integrated circuits where signal terminals are coupled with the signal line 1 and the reference line 2.

The semiconductor integrated circuits LS11–LS13 are provided with logic circuits (LOGIC) 9–11, output circuits 3–5 and input circuits 6–8 respectively. The semiconductor integrated circuits LS11–LS13 are mounted on a circuit board (not shown), and the operation power source is supplied from the ground potential GND provided to the circuit board and the power supply wiring of the power supply voltage VDD. The ground potential GND as the terminal end potential of the reference line 2 is supplied through the power supply wiring of the circuit board, and the terminal end potential VT of the signal line 1, although not particularly limited thereto, is supplied through the power supply circuit on the circuit board.

The output circuit (transmitting circuit) 3 is arranged between the signal line 1 and the ground potential of the semiconductor integrated circuit (ground potential supplied through the power supply wiring for the ground potential GND on the circuit board to the semiconductor integrated circuit), and is provided with N-channel type drive MOSFET Q1 switch-controlled by the output drive signal of the inverter circuit INV1 as output control signal and with N-channel type switching MOSFET Q1' arranged between the reference line 2 and the ground potential of the semiconductor integrated circuit and controlled in ON/OFF state in synchronization with the ON/OFF state of the drive MOSFET Q1. The MOSFETs Q1 and Q1' together are in open drain form, and are switch-controlled by the output drive signal formed by the inverter circuit INV1 according to this embodiment. The output drive signal is outputted from an inverter INV1 inverse-outputting on receiving the output signal of the logic circuit 9, and includes bus transmission information.

The input circuit (receiving circuit) 6 similarly to the above-mentioned embodiment, has input offset made reference potential (reference voltage) discriminating potential to appear on the signal line 1 by the ON-state of the drive MOSFET of other semiconductor integrated circuit or potential VT to appear on the signal line 1 by the OFF-state, and carries out differential amplification of the level difference between level adding the input offset to the level of the reference line 2 and level of the signal line 1 and supplies the amplified signal to the logic circuit 9.

In other words, the input circuit 6 has the input offset so that potential appearing on the signal line 1 by the ON-state of the drive MOSFET can be discriminated with respect to the ground potential GND as reference potential, and carries out differential amplification of the level difference between the reference input signal of the reference line 2 and the level of signal waveform of the signal line 1 and supplies the amplified signal to the logic circuit 9. The input offset in the input circuit 6, although not particularly limited thereto, is made about VT/2=+0.4 V according to this embodiment. Such offset can be formed, for example, by unbalance of the circuit constant of a pair of differential circuits in the input circuit 6.

In the input circuit 6 having such input offset, the ground potential GND is inputted as reference voltage apparently, but in actual fact, voltage level-adding the input offset to the ground potential GND becomes the reference voltage in the circuit operation and differential amplification is carried out. Consequently, the input circuit 6 outputs a signal of logic level in response to that the level of the signal waveform of the signal line 1 is higher or lower than the voltage level adding the input offset to the ground potential GND of the reference line 2. The logic circuit 9 has suitable logic constitution in response to function of the semiconductor integrated circuit including the logic circuit 9, and the specific logic constitution or circuit constitution is not limited.

Operation of the embodiment shown in FIG. 11 will be described as follows. When any of the output circuits 3–5 of the plural semiconductor circuits LSI1–3 is not operated, potential of the signal line 1 has the same value as the terminal end voltage VT. Now, for example, if the output operation of the output circuit 3 of the semiconductor integrated circuit LSI1 is selected and the drive MOSFET Q1 of open drain is turned on by the drive signal for example, the potential of the signal line 1 is lowered towards the ground potential. In this embodiment, the reference line 2 is terminated to the ground potential GND and is connected to the reference input of the differential input circuits 6–8 of the semiconductor integrated circuits LSI1–LSI3. Then since the input circuits 6–8 have the input offset corresponding to the reference voltage Vref, if the potential of the signal line 1 is lowered to the input offset voltage or less, the input circuit 7 or 8 of other semiconductor integrated circuit LSI2 or LSI3 to carry out the input operation can discriminate variation of the input.

Although constitution corresponding to one bit is only shown in FIG. 11, for example, during simultaneous output of multi bits by a number of output circuits included in the semiconductor integrated circuit LSI1, if a number of drive MOSFETs Q1 or the like are turned on simultaneously and currents are supplied from a number of output circuits towards the common ground potential pattern within the semiconductor integrated circuit chip (wiring pattern supplying the ground potential within the semiconductor integrated circuit), the ground potential of the ground potential pattern is varied due to the pattern or inductance component of a bonding wire or a lead terminal connected to the pattern, and undesirable noise component is produced. Such ground noise is superposed to transmission waveform of small amplitude appearing on the signal line 1 as above described, and varies the level of the signal line 1 undesirably.

In this embodiment, the above-mentioned noise is transmitted also to the reference line 2 through the switching MOSFET Q1' switch-controlled in the same phase as that of the drive MOSFET Q1. In other words, on the signal line 1 and the reference line 2, the same ground noise appears in the same phase. Consequently in other semiconductor integrated circuit LSI2 or LSI3 connected through the signal line 1 and the reference line 2 as above described, since the same ground noise appears on the signal line 1 and the reference line 2 transmitted to an input circuit 7 or 8, the noise can be canceled during the differential amplification. This improves S/N of a signal to be transmitted and enables the signal amplitude becoming amplitude smaller than +0.8 V of the GTL bus circuit; thereby high speed of signal transmission by a bus is realized and also the terminal end potential of the signal line can be made such as 0.8 V lower than that of the GTL bus circuit and the signal transmission of the low consumption power can be realized.

Then in the semiconductor integrated circuit LSI2 or LSI3 at the reception side, switching MOSFETs Q2' and Q3' installed corresponding to the reference line 2 are turned off together. Consequently, noise put on the reference line with the intention is not transmitted to the ground potential of the semiconductor integrated circuits LSI2 and LSI3. Since undesirable noise does not appear on the ground potential of the logic circuits 10 an 11 of such semiconductor integrated circuits LSI2 and LSI3, no problem is produced in that the operation margin be deteriorated.

In the input circuit in this embodiment, the circuit shown in FIG. 8 can be utilized. That is, the description will be repeated using FIG. 8 as follows. The input circuit is constituted by a level shift circuit LS in which an input signal of small amplitude deviated to the ground potential side is potential-shifted to nearly the intermediate level between the power supply voltage VDD and the ground potential ND, a differential amplifier circuit DA which carries out differential amplification of output of the level shift circuit LS, and a buffer circuit BA which converts output of the differential amplifier circuit DA into signal amplitude of CMOS level (VDD for example 5V).

In the level shift circuit LS, small level variation deviated to the ground potential of the signal line 1 is subjected to potential shift into level variation in the vicinity of the operating point having the highest sensitivity in the amplification operation of the sense amplifier DA. That is, although not particularly limited thereto, in the level shift circuit LS, drain potential of the output is varied to follow the input voltage. More specifically, N-channel type MOSFETs Q6, Q7 with gate biased by the power supply voltage VDD are connected in series to P-channel type MOSFETs Q4, Q5 as current amplifying transistors, and although not particularly limited thereto, an input terminal INB corresponding to gate of the MOSFET Q4 is coupled with the signal line 1, and an input terminal INT corresponding to gate of the MOSFET Q5 is coupled with the reference line 2.

Common source of the MOSFETs Q4, Q5 is coupled with the power supply voltage VDD through P-channel type MOSFET Q8 with gate biased to the ground potential, and common source of the MOSFETs Q6, Q7 is coupled with the ground potential through a power switch MOSFET Q15 switch-controlled by a control signal EN. Output terminals of the level shift circuit LS are made coupling node b of the MOSFETs Q4 and Q6 and coupling node a of the MOSFETs Q5 and Q7. The level shift amount of the output voltage with respect to the input voltage in the level shift circuit LS is determined by the threshold voltage of the MOSFET Q4 (Q5), capacitance of the gate oxide film and carrier moving within the channel and by source%drain current of the MOSFET Q6 (Q7). In relation to the operating point of the sense amplifier DA at next stage, for example, in the case of 5 V power supply, the level shift amount is set to about 2 V –2.5 V.

Since the output load of the level shift circuit LS is only the input gate capacitance of the sense amplifier DA at next stage, time required for the level shift circuit operation by the level shift circuit is made substantially negligible short time. Moreover, when the level shift circuit LS is activated, DC current path is formed in its structure, and since the drive load of the level shift circuit LS is quite small, even if the passing current of the DC current path is relatively small, the high speed shift operation is not substantially affected, and corresponding to this, constant of the MOSFET constituting the level shift circuit is suitably set.

The sense amplifier DA, although not particularly limited thereto, comprises a pair of N-channel type input MOSFETs Q9, Q10 constituting a differential pair with source commonly connected, P-channel type MOSFETs Q11, Q12 constituting a current mirror load and coupled with drain electrodes of the input MOSFETs Q9, Q10, and N-channel type MOSFET Q14 having gate biased by the supply voltage VDD and coupled with common source of the MOSFETs Q9, Q10 and drain of the power switch MOSFET Q15. Source electrode of the P-channel type MOSFETs Q11, Q12 constituting the current mirror load is connected to the power supply voltage VDD, and the common connecting end of their gate electrodes is coupled with drain electrode of the input MOSFET Q11. Gates of the MOSFETs Q9, Q10 are supplied with outputs b, a of the level shift circuit LS respectively.

The input offset in the input circuit of FIG. 8, although not particularly limited thereto, is set by unbalance of conductance or gate width with the MOSFETs Q11 and Q12 constituting the active load, or by similar unbalance with the input MOSFETs Q9 and Q10, and further by similar unbalance by both the active load MOSFET and the input MOSFET. Such input offset may be set in that the level shift amount in the level shift circuit LS is unbalanced laterally.

Drain of the MOSFET Q10 is coupled as output of the sense amplifier DA with input of a buffer circuit of next stage. The buffer circuit is constituted by CMOS inverters INV4, INV5 connected in series. Between input of the CMOS inverter INV5 and the power supply voltage VDD, although not particularly limited thereto, P-channel type preset MOSFET Q13 receiving the control signal EN on its gate is installed. Output OUT of the CMOS inverter INV5 is supplied to the logic circuit 9 or the like as above described.

If the control signal EN is made low level, since the power switch MOSFET Q15 is turned off, the sense amplifier DA is made non-operation state and the drain potential of the MOSFET Q16 is becoming indefinite level. However, since the control signal EN is made low level thereby the preset MOSFET Q13 is turned on, the input of the CMOS inverter circuit INV4 being an input stage circuit of the buffer circuit is forcedly made the power supply voltage VDD of the circuit, and in the non-active state of such input circuit, the output signal OUT is fixed to the level of the power supply voltage VDD.

On the other hand, if the control signal EN is made high level, since the power switch MOSFET Q15 is turned on and the preset MOSFET Q13 is turned off, the level shift circuit LS and the sense amplifier DA are activated. Then in levels of the signal line 1 and the reference line 2, the center level is shifted by the level shift circuit LS and complementary signals b and a having bias level such as VDD/2 are formed and transmitted to the sense amplifier DA. In this embodiment, the sense amplifier DA is designed so that the amplification factor becomes maximum at the bias level VDD/2 as above described.

Figure 12:
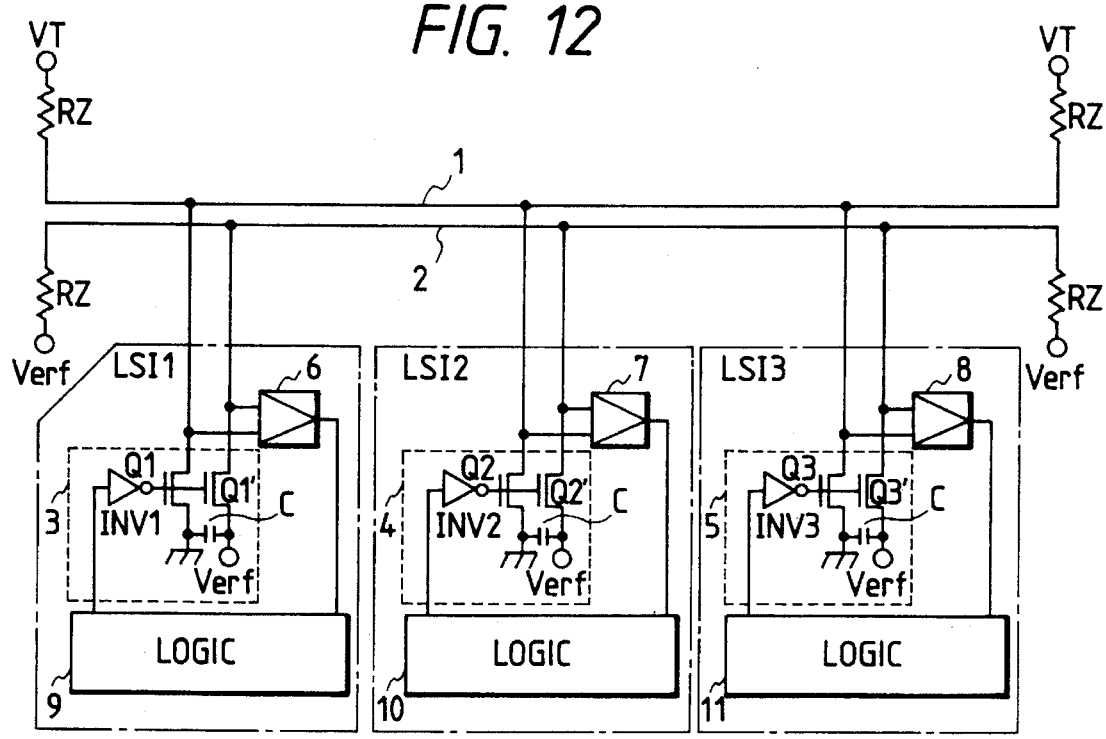
FIG. 12 is a circuit diagram showing still another embodiment of a signal transmission circuit according to the invention.

FIG. 12 shows a signal transmission circuit according to still another embodiment of the present invention. In FIG. 12, a signal line corresponding to one bit is exemplified. In the embodiment shown in FIG. 11, an input circuit having input offset corresponding to the reference potential is required, but this embodiment applies input circuits 6'–8' in form receiving the reference voltage itself similarly to the TL bus circuit in the prior art.

That is, difference in constitution from the embodiment of FIG. 11 is in that terminal voltage of a reference line 2 is made reference potential Vref, and source of N-channel type switching MOSFETs Q1'–Q3' in open drain form of output circuits 3–5 connected to the reference line 2 is connected not to the ground potential of the circuit but to the reference potential Vref generated, for example, in an inner circuit of a semiconductor integrated circuit.

In the output circuits 3–5, a coupling capacitor is connected between the ground potential of the circuit and the reference potential Vref, and variation (noise) of the ground potential of the semiconductor integrated circuit being made transmission side is superposed on the reference potential Vref through the coupling capacitor and is supplied to the reference line 2.

When the input operation is commanded from logic circuits 9–11, input circuits 6'–8' supply a signal of logic value in response to that the level of the signal line 1 is lower or higher than the level of the reference line 2 to the logic circuits 9–11. Also in the constitution of the input circuits 6'–8', the circuit constitution similar to that in FIG. 8 may be adopted. In the case of this embodiment, however, the input offset need not be set actively, and difference from the case used in the embodiment of FIG. 11 is in that circuit characteristics of respective differential circuits in the level shift circuit LS and the sense amplifier DA are balanced laterally.

Although constitution corresponding to one bit only is shown also in the embodiment of FIG. 12, during simultaneous output of multi bits by a number of output circuits 3 included in one semiconductor integrated circuit, if a number of drive MOSFETs Q1 or the like are turned on simultaneously and currents are supplied from a number of input circuits 3 towards the common ground potential pattern within the semiconductor integrated circuit chip LSI1, the ground potential of the ground potential pattern is varied due to the pattern or inductance component of a bonding wire or a lead terminal connected to the pattern, and undesirable noise component is produced.

Such ground noise is superposed to transmission waveform of small amplitude appearing on the signal line 1, and varies the signal of the signal line 1 undesirably. Then the ground noise is superposed on the reference potential Vref through the coupling capacitor C. As a result, the ground noise is transmitted also to the reference line 2 through the switching MOSFET Q1' switch-controlled in the same phase as that of the drive MOSFET Q1. In other words, on the signal line 1 and the reference line 2, the same ground noise appears in the same phase.

Consequently, since the same switching noise appears on the level of the signal line 1 and the reference line 2 transmitted to an input circuit 7 or 8 of other semiconductor integrated circuit device LSI2 or LSI3, the noise can be canceled during the differential amplification. Therefore similarly to the embodiment in FIG. 11, S/N of a signal to be transmitted can be improved and the signal amplitude can be made amplitude smaller than 0.8 V of the GTL bus circuit, and high speed of signal transmission by a bus can be realized. In the semiconductor integrated circuit LSI2 or LSI3 being made the reception side, since switching MOSFETs Q2' an Q3' are turned off, such trouble can be prevented that the noise put on the reference line 2 with the intention be mixed to the ground potential.

Also in this embodiment, the terminal end potential of the signal line 1 can be made such as 0.8 V lower than that of the GTL bus circuit, and the signal transmission of the low consumption power can be realized. In particular in this embodiment, a generating circuit of the reference potential Vref must be installed on the circuit board but special offset voltage need not be set to the input circuits 6–8. Therefore coexistence with the GTL bus circuit or direct interface with the GTL bus circuit is possible.

Figures 13A, 13B, 13C:
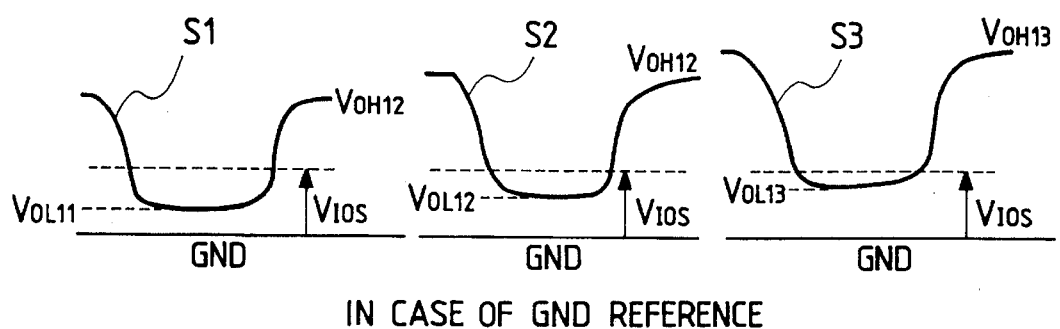
FIG. 13(A), 13(B), and 13(C) are waveform charts explaining an example of operation in the signal transmission circuit according to the invention when the ground potential is made reference.

When the reference voltage is made the ground potential of the circuit as shown in the embodiment of FIG. 1, use region of the terminal end voltage VT is limited as shown in a waveform chart of FIG. 13. That is, as shown in FIG. 13(A), when the terminal end voltage VT is relatively low such as about 0.8 V, low level VOL11 of the signal S1 is determined by the ON-resistance value of the drive MOSFET Q1 and current flowing through it. Thus when the terminal end voltage VT is relatively low, since also the low level VOL11 is relatively small, the level margin can be secured by the offset VIOS with respect to the ground potential GND.

However, when the terminal end voltage is raised, the current flowing through the drive MOSFET is increased as seen in (B) or (C), and as seen in the signals S2 and S3, level rises as seen in low levels VOL12, VOL13 but since the offset voltage VIOS as the substantial reference voltage is fixed, the margin at the low level side is lost. That is, when the ground potential of the circuit is made the reference voltage as in the embodiment of FIG. 1 or FIG. 11, setting region of the terminal end voltage VT is narrowed, and in the system using the terminal end voltage VT in relatively wide region, the use convenience becomes bad.

Figures 14A, 14B, 14C:
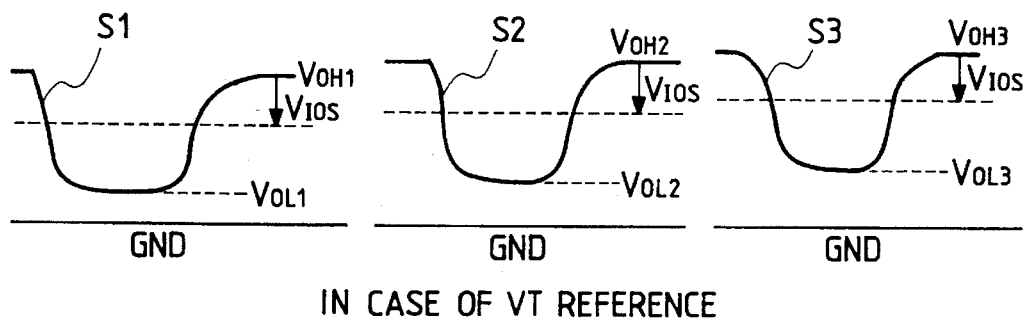
FIG. 14(A), 14(B), and 14(C) are waveform charts explaining an example of operation in the signal transmission circuit according to the invention when the terminal end voltage is made reference.

When the terminal end voltage VT is used as the reference voltage as shown in the embodiment of FIG. 7, the terminal end voltage VT is increased as shown in FIG. 14 (A), (B) and (C), and even when the voltage is raised with respect to the ground potential GND as seen in the low levels VOL1, VOL2 and VOL3 of the signals S1, S2 and S3, since the offset voltage VIOS as the substantial reference voltage is set with respect to the terminal end voltage VT as seen in respective high levels VOH1, VOH2 and VOH3, it is not affected by the terminal end voltage VT. Thus, in the constitution using the terminal end voltage VT as the reference voltage, setting region of the terminal end voltage VT can be widened or cannot be substantially affected by the variation.

Figure 15:
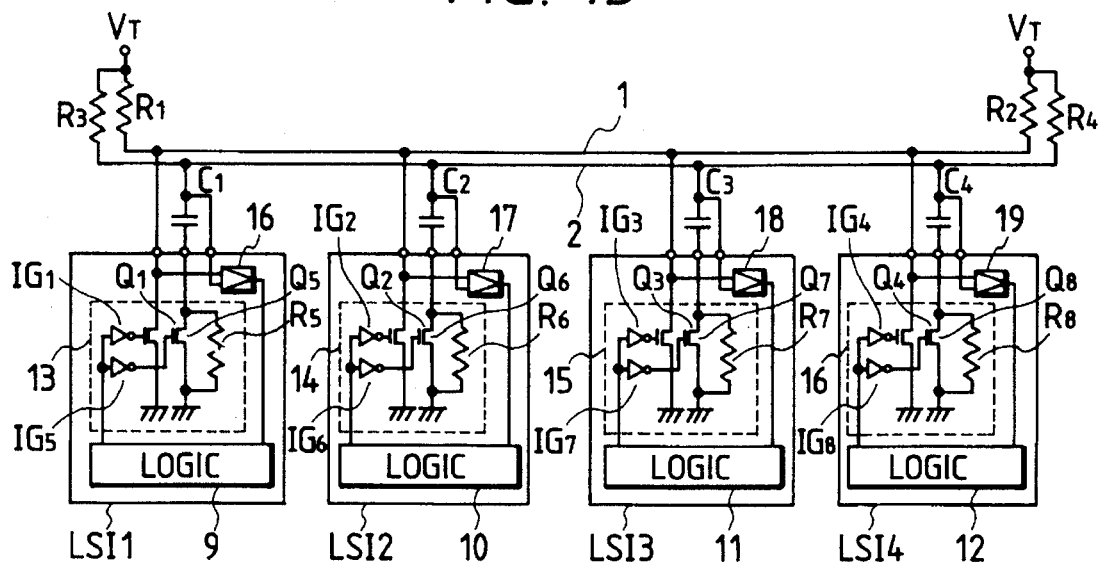
FIG. 15 is a circuit diagram showing still another embodiment of a signal transmission circuit according to the invention.

FIG. 15 shows a circuit diagram of still another embodiment of a signal transmission circuit according to the present invention. This embodiment corresponds to the case that the terminal end voltage VT is used as reference voltage. A signal transmission path in FIG. 15 similarly to the embodiment in FIG. 1, is formed in a package substrate such as a print circuit board on which an electronic device including a semiconductor integrated circuit device is mounted or in a semiconductor integrated circuit of large scale.

In FIG. 15, circuit constitution of one bit included in a bus of plural bits is exemplified, and a reference line 2 traveling in parallel to the signal line 1 of one bit is installed and both ends of the signal line 1 and the reference line 2 are terminated by terminal end resistors RZ each having value equal to the characteristic impedance of the line and the terminal end voltage VT is supplied. The terminal end voltage VT, although not particularly limited thereto, is made +0.8 V lower than +1.2 V in a GTL bus circuit similarly to the above description. LSI1–LSI4 designate a plurality of semiconductor integrated circuits where signal terminals are coupled with the signal line 1 and the reference line 2.

The semiconductor integrated circuits LSI1–LSI4 are provided with logic circuits (LOGIC) 9–12, output circuits 13–16 and input circuits 16–19 respectively. The semiconductor integrated circuits LSI1–LSI4 are mounted on a circuit board (not shown), and the operation power source is supplied from the ground potential GND provided to the circuit board and the power supply wiring of the power supply voltage VDD. The terminal end voltage VT of the signal line 1 and the reference line 2, although not particularly limited thereto, is supplied through the power supply circuit on the circuit board.

The output circuit (transmitting circuit) 13 installed in the semiconductor integrated circuit LSI1 is arranged between the signal line 1 and the ground potential of the semiconductor integrated circuit LSI1 (ground potential supplied through the power supply wiring for the ground potential GND on the circuit board to the semiconductor integrated circuit), and is provided with N-channel type drive MOSFET Q1 switch-controlled by output drive signal of an inverter circuit IG1 as output control signal and with N-channel type switching MOSFET Q5 arranged between the output terminal connected to the reference line 2 through a coupling capacitor C1 and the ground potential of the semiconductor integrated circuit and controlled in ON/OFF state in synchronization with the ON/OFF state of the drive MOSFET Q1 by output drive signal of an inverter circuit IG2 similar to the above description. The MOSFETs Q1 and Q5 together are in open drain form, and are switch-controlled by the output drive signal formed by the inverter circuits IG1, IG2 provided respectively corresponding to these according to this embodiment.

The input circuit (receiving circuit) 16 installed in the semiconductor integrated circuit LSI1 similarly to the above-mentioned embodiment, has input offset made reference potential (reference voltage) discriminating potential to appear on the signal line 1 by the ON-state of the drive MOSFET of other semiconductor integrated circuit or potential VT to appear on the signal line 1 by the OFF-state, and carries out differential amplification of the level difference between level adding the input offset to the level of the reference line 2 and level of the signal line 1 and supplies the amplified signal to the logic circuit 9. However, the input circuit 16 is provided with an input terminal exclusive for fetching the level of the reference line 2. That is, in this embodiment, since the coupling capacitor C1 is installed as above described, it cannot be connected to drive MOSFET Q5 at the reference voltage side of the output circuit 13 within the semiconductor integrated circuit LSI1. A resistor R5 connected in parallel to the MOSFET Q5 constitutes a bias circuit which applies the terminal end voltage VT steadily to the coupling capacitor C1 when the MOSFET Q5 is at the OFF-state.

In other words, the input circuit 16 has the input offset so that potential appearing on the signal line 1 by the ON-state of the drive MOSFET can be discriminated with respect to the terminal end voltage VT as reference potential, and carries out differential amplification of the level difference between the reference input signal of the reference line 2 and the level of signal waveform of the signal line 1 and supplies the amplified signal to the logic circuit 9. The input offset in the input circuit 16, although not particularly limited thereto, is made about VT/2=+0.4 V according to this embodiment. Such offset can be formed, for example, by unbalance of the circuit constant of a pair of differential circuits in the input circuit 16.

In the input circuit 16 having such input offset, the terminal end voltage VT is inputted as reference voltage apparently, but in actual fact, voltage level adding the input offset to the terminal end voltage VT becomes the reference voltage in the circuit operation and differential amplification is carried out. Consequently, the input circuit 16 outputs a signal of logic level in response to that the level of the signal waveform of the signal line 1 is higher or lower than the voltage level adding the input offset to the terminal end voltage VT of the reference line 2. The logic circuit 9 has suitable logic constitution in response to function of the semiconductor integrated circuit including the logic circuit 9, and the specific logic constitution or circuit constitution is not limited. Output circuits 14–16 and input circuits 17–19 installed at other semiconductor integrated circuits LSI2–LSI4 are constituted by similar circuits.

Operation of the embodiment shown in FIG. 15 will be described as follows. When any of the output circuits 13–16 of the plural semiconductor integrated circuits LSI1–4 is not operated, potential of the signal line 1 has the same value as the terminal end voltage VT. Now, for example, if the output operation of the output circuit 13 of the semiconductor integrated circuit LSI1 is selected and the drive MOSFET Q1 of open drain is turned on by the drive signal for example, the potential of the signal line 1 is lowered towards the ground potential. In this embodiment, the reference line 2 is terminated to the terminal end voltage VT and is connected to the reference input of the differential input circuits 16–19 of the semiconductor integrated circuits LSI1–LSI4. Then since the input circuits 16–19 have the input offset corresponding to the reference voltage Vref, if the potential of the signal line 1 is lowered to the input offset voltage or less, in at lest one input circuit of other semiconductor integrated circuits LSI2–LSI4 to carry out the input operation, variation of the input can be discriminated.

Although constitution corresponding to one bit is only shown in FIG. 15, for example, during simultaneous output of multi bits by a number of output circuits included in the semiconductor integrated circuit LSI1, if a number of drive MOSFETs Q1 or the like are turned on simultaneously and currents are supplied from a number of output circuits towards the common ground potential pattern within the semiconductor integrated circuit chip (wiring pattern supplying the ground potential within the semiconductor integrated circuit), the ground potential of the ground potential pattern is varied due to the pattern or inductance component of a bonding wire or a lead terminal connected to the pattern, and undesirable noise component is produced. Such ground noise is superposed to transmission waveform of small amplitude appearing on the signal line 1 as above described, and varies the level of the signal line undesirably.

In this embodiment, the above-mentioned noise is transmitted also to the reference line 2 through the switching MOSFET Q1 switch-controlled in the same phase as that of the drive MOSFET Q1 and the coupling capacitor C1. In other words, on the signal line 1 and the reference line 2, the same ground noise appears in the same phase. Consequently in other semiconductor integrated circuits LSI2–LSI4 connected through the signal line 1 and the reference line 2 as above described, since the same ground noise appears on the signal line 1 and the reference line 2 transmitted to at least one input circuit, the noise can be canceled during the differential amplification. This improves S/N of a signal to be transmitted and enables the signal amplitude becoming amplitude smaller than +0.8 V of the circuit, thereby high speed of signal transmission by a bus is realized and also the terminal end potential of the signal line can be made such as +0.8 V lower than that of the GTL bus circuit and the signal transmission of the low consumption power can be realized.

Then in the semiconductor integrated circuits LSI2–LSI4 at the reception side, switching MOSFETs Q6–Q8 installed corresponding to the reference line 2 are turned off together. Consequently, noise put on the reference line 2 with the intention is not transmitted to the ground potential of the semiconductor integrated circuits LSI2–LSI4. Since undesirable noise does not appear on the ground potential of the logic circuits 10–12 of such semiconductor integrated circuits LSI2–LSI4, no problem is produced in that the operation margin be deteriorated.

Figure 16:
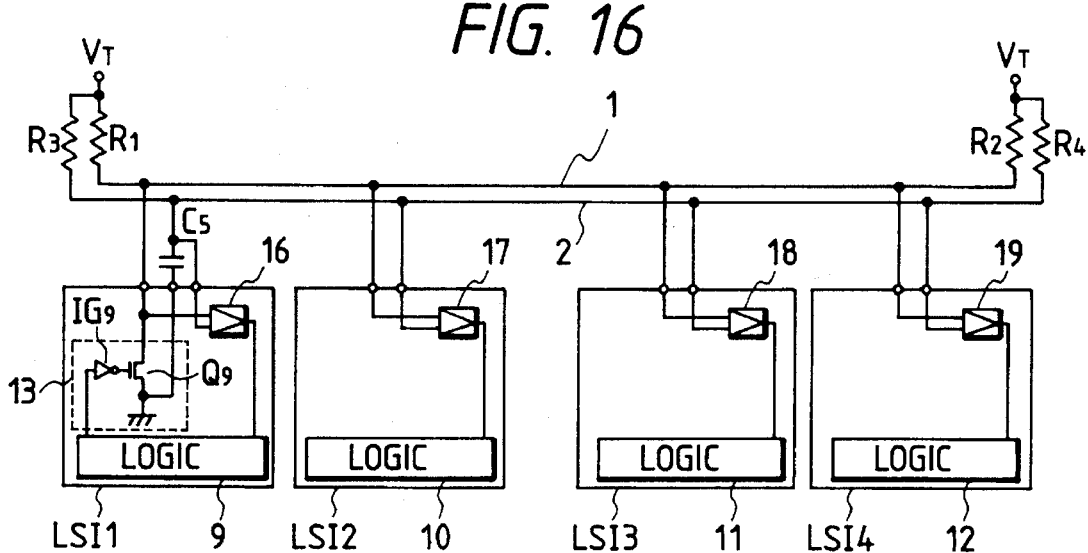
FIG. 16 is a circuit diagram showing still another embodiment of a signal transmission circuit according to the invention.

FIG. 16 shows a circuit diagram of still another embodiment of a signal transmission circuit according to the present invention. This embodiment corresponds to the case that the terminal end voltage VT is used as reference voltage. A signal transmission path in FIG. 16 similarly to the embodiment in FIG. 1, is formed in a package substrate such as a print circuit board on which an electronic device including a semiconductor integrated circuit device is mounted or in a semiconductor integrated circuit of large scale.

In this embodiment, signals are not received between a plurality of semiconductor integrated circuits LSI1–LSI4 with signal terminals connected to the signal line 1 and the reference line 2, but the semiconductor integrated circuit LSI1 is used exclusively for transmission and other semiconductor integrated circuits LSI2–LSI4 are used exclusively for reception. In this constitution, in the semiconductor integrated circuit LSI1 to be used exclusively for transmission, an input circuit 16 is not required basically but is installed to carry out monitoring of an output signal or the like.

Since the semiconductor integrated circuits LSI2–LSI4 are used exclusively for reception as above described, an output circuit 13 of the semiconductor integrated circuit LSI1 used exclusively for transmission, together with a drive MOSFET Q9, outputs noise of the ground potential generated there intact through an output terminal. The output terminal is connected to the reference line 2 by a coupling capacitor C5. Thus when a signal is transmitted in one direction only, the output circuit is simplified.

Figure 17:
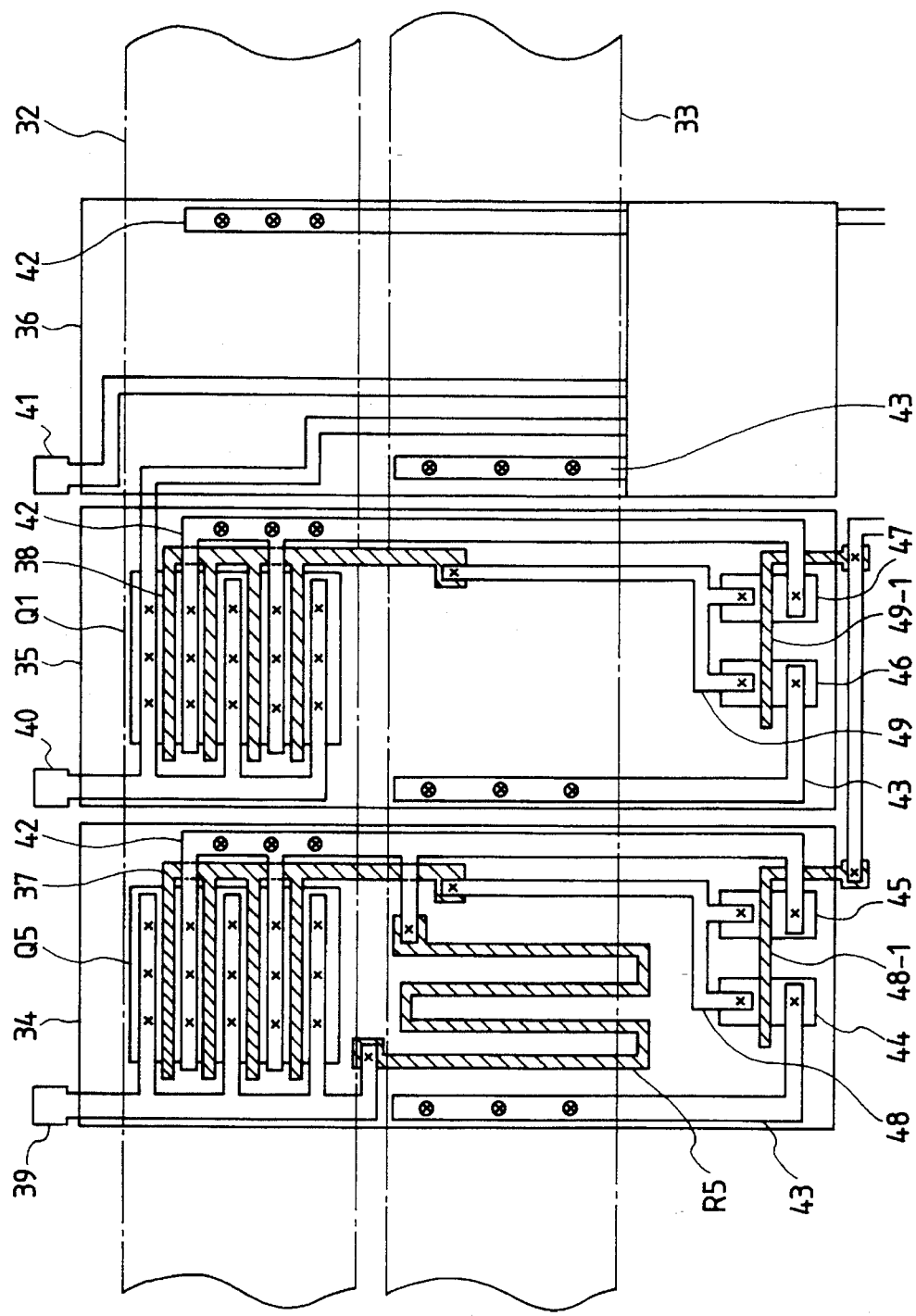
FIG. 17 is a layout diagram showing an embodiment of a part of an output circuit and an input circuit in FIG. 15.

FIG. 17 shows a layout diagram of an embodiment of a part of an output circuit and an input circuit corresponding to one bit in the embodiment of FIG. 15. Each pattern to constitute a circuit element of FIG. 17 is formed on a semiconductor substrate such as monocrystalline silicon by known manufacturing technology of semiconductor integrated circuits.

Numeral 32 designates a wiring formed in an aluminum layer of the second layer for supplying the ground potential of the circuit. Numeral 33 designates a wiring formed in an aluminum layer of the second layer for supplying the power supply voltage VDD. At the lower side of the ground wiring 32 are formed drive MOSFETs Q1 and Q5. Numerals 39 and 40 designate wirings formed in an aluminum layer of the first layer and connected to drain of output MOSFETs Q5 and Q1. Numeral 42 designates a wiring formed in an aluminum layer of the first layer and connected to source of the output MOSFETs Q5 and Q1 and also extending intact and connected to source of N-channel type MOSFET to constitute CMOS inverter circuits IG1 and IG5. The wiring 42 is connected to the aluminum layer 32 of the second layer and supplied with the ground potential of the circuit.

Numerals 37 and 38 designate polysilicon layers constituting gate electrode of the MOSFETs Q5 and Q1, and connected to drain of P-channel type MOSFET and N-channel type MOSFET being output of the CMOS inverter circuits IG5 and IG1, by wirings 48 and 49 formed in an aluminum layer of the first layer. Numerals 48-1 and 49-1 designate wirings formed in polysilicon layers and constituting gate electrodes of N-channel type MOSFET and P-channel type MOSFET to constitute the CMOS inverter circuits IG5 and IG1 and also constituted to a logic circuit (not shown) in common connection by wiring for transmitting a signal to be outputted.

A resistor R5 supplies bias voltage steadily to a coupling capacitor connected to the output terminal 39 to which drain of the drive MOSFET Q5 is connected, and is constituted by a polysilicon layer formed simultaneously with the gate electrode of the MOSFET. One end of the resistor R5 is connected to a wiring 42 to give the ground potential of the circuit, and other end is connected to a wiring formed integrally with the output terminal 39.

An input terminal 41 is connected to an input terminal of an input circuit (not shown). An internal wiring 42 gives the ground potential to the input circuit similarly to the above description. Numerals 34, 35 an 36 designate cell regions of the output circuit and the input circuit. Thus when the cells 34 and 35 of the output circuit are arranged closely, even if noise is superposed on the wiring giving the ground potential due to the switching operation of the drive MOSFET Q1, since Q5 and Q1 are arranged closely, the same noise can be outputted to the reference line 2.

Figure 18:
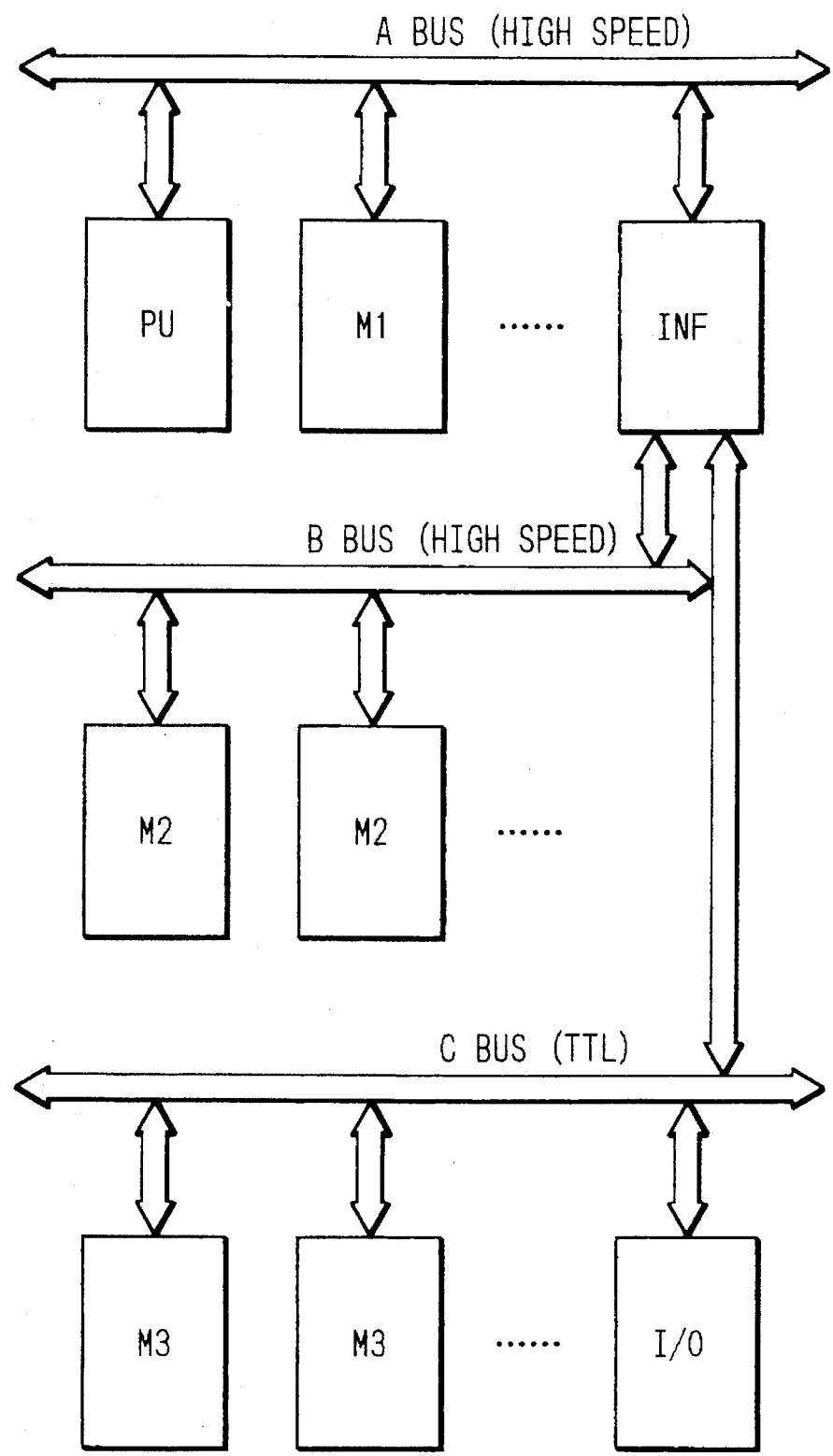
FIG. 18 is a block diagram showing an embodiment of information processing system according to the invention.

FIG. 18 shows a block diagram of an embodiment of information processing system according to the present invention. Although not particularly limited thereto, this embodiment is directed to information processing system of high speed and high performance, such as a workstation.

A processor unit PU of high speed and high performance is connected, by A bus (high speed bus) comprising a signal transmission circuit as shown in the above-mentioned embodiment, to a high speed memory MI in Bi-CMOS constitution, constituted by a bipolar transistor or by combining a bipolar transistor and a CMOS circuit, and to an interface INF.

The processor unit PU accesses the high speed memory M1 or the like at high speed through the A bus, and carries out the data processing. A peripheral device such as a coprocessor unit having special data processing such as decimal point arithmetic or picture processing is connected to the A bus, if necessary.

The A bus may be an inner bus provided to a processor unit itself of high speed and high performance constituted by super LSI. In this case, the A bus is formed within the semiconductor integrated circuit. In this case, in order that influence of the external noise is made small and the heat generation at the terminal end resistor is suppressed to minimum, the terminal end voltage VT is decreased extremely. For example, it is decreased to about 0.5 V as above described.

The interface INF has function of performing mutual signal transmission operation between the bus A and the bus B. Also in the B bus, although not particularly limited thereto, a bus circuit of high speed and low consumption power, as shown in the above-mentioned embodiment, is used. A memory device M2 or the like of relatively high speed, such as CMOS static type RAM, is connected to the B bus. The B bus is provide with, in addition to the memory device M2, other peripheral circuit of relatively high speed required in response to performance and function of the system.

The interface INF has also function of performing mutual signal transmission operation between the A bus and C bus. The C bus is constituted by a general-purpose TTL bus used widely in the prior art. Thus, a memory device M3 such as a dynamic type RAM where relatively slow operation is allowed, a control circuit for a magnetic disc, a display device, a printer, or an input/output device I/O such as a keyboard is connected.

By assembling such C bus within the system, in a peripheral circuit where the operation speed is not required, advantage is produced in that a memory device, an input/output circuit and a bus circuit existing already may be used intact.

That is, in the information processing system of this embodiment, parts where data transfer speed may be slow, such as a display, a printer or a keyboard, are connected to a conventional TTL, and in parts where data transfer speed is made rapid or the consumption power becomes a problem, a signal transmission circuit according to the present invention is used so that information processing system being rational and efficient can be constituted.

Figure 19:
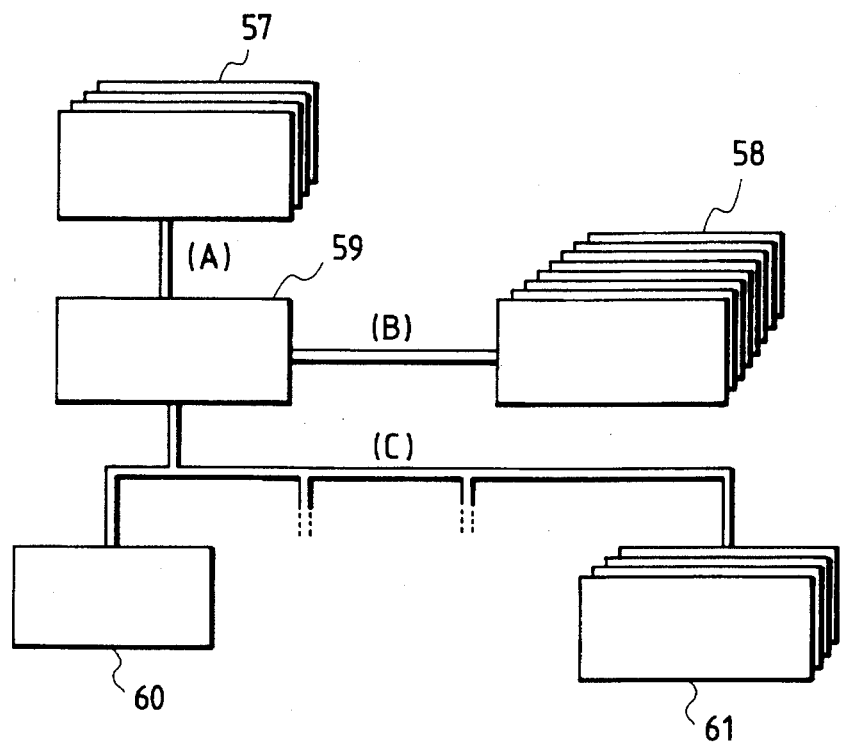
FIG. 19 is a block diagram showing another embodiment of workstation system to which the signal transmission circuit is applied.

FIG. 19 shows a block diagram of another embodiment of a workstation system to which the above-mentioned signal transmission circuit is applied. The workstation system of this embodiment is provided with a high-performance processor unit 57 which carries out various sorts of data processings, a high-speed memory unit 58 where a work region of the high-performance processor unit 57 and a temporary storage region of data and the like are made, an I/O control unit 61 which is interfaced with various sorts of peripheral devices, a general-purpose LSI 60 which is positioned as other peripheral LSI, and an interface LSI 59 to carry out the interface control as above described.

The high-speed performance processor unit 57 and the interface LSI 59 are coupled by a bus 70, and an interface LSI 63 and a high-speed memory unit 62 are coupled by a bus (A). The interface LSI 59, the I/O control unit 61 and the general-purpose LSI 60 are coupled by a TTL interface bus (C).

In this workstation system, the bus (A) and the bus (C) are made a high-speed bus of low consumption power type using the signal line 1 and the reference line 2. The high-performance processor unit 57, the interface unit 59 and the high-speed memory unit 8 are constituted by semiconductor integrated circuits represented by the semiconductor integrated circuits LSI1–LSI4 as described in FIG. 11 or FIG. 15. Consequently, since wrong operation due to the ground noise can be prevented during the data transmission between the high-speed processor unit 57 and the high-speed memory unit 58, even if the signal amplitude is made smaller than that of a conventional GTL bus circuit, the high-speed signal transmission can be realized with high reliability.

Figure 20:
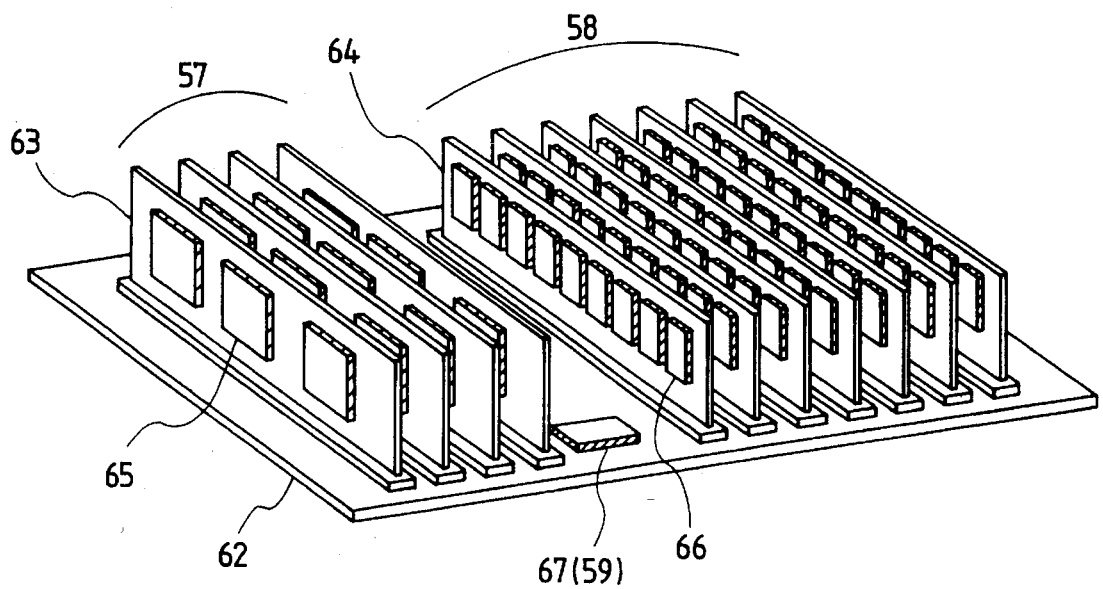
FIG. 20 is an appearance view showing an embodiment of the workstation system in FIG. 19.

FIG. 20 shows an appearance view of an embodiment of a workstation system as above described. The system as a whole constituted by high-speed buses is mounted on a system board 62. A high-speed processor unit 57 is constituted by processor LSIs 65 respectively mounted on a module board 63. Transmission path between the processor LSIs 65 mounted on one module board 63 is constituted by a print wiring formed on such a module board. Connection between plural module boards is carried out by a connector provided on the system board and a print wiring formed on the system board.

Also a high-speed memory unit 58 is constituted by high-speed memory LSIs 66 respectively mounted on a module board 64. Access to the high-speed memory LSIs 66 mounted on one module board 64 is carried out by a connector provided on the system board and a high-speed bus constituted by the signal line 1 and the reference line 2 comprising a print wiring formed on the system board. An interface LSI 67 constituting an interface unit 59 is mounted on the system board 62 and connected by a print wiring formed on such system board 62.

System comprising a low-speed bus is brought together an constituted on other system board. The low-speed bus passing through the interface LSI 67 is connected through a print wiring formed on the system board 62 mounting it and a connector (not shown), to a low-speed bus of the system board by wiring means such as a flat cable.

Figure 21A:
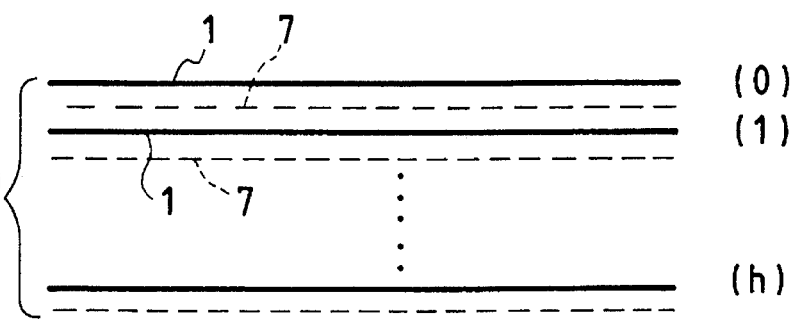
FIGS. 21(A), 21(B), and 21(C) are pattern diagrams showing an embodiment of a signal line 1 and a reference line 2 in a high speed bus according to the invention.

FIG. 21 shows a pattern diagram between the signal line 1 and the reference line 2 in a high-speed bus as above described. A bus of FIG. 21(A) shows an example that in a bus of (n+1) bits from 0 to n, the signal line 1 and the reference line 2 are installed in one-to-one correspondence.

In this case, noises in the same phase completely appear on the signal line 1 and the reference line 2 of each output bit, and function of canceling the switching noise of the drive MOSFET Q1 can be completed. Also since a reference line 2 is interposed between all neighboring signal lines 1, a reference line 2 supplied with the potential GND or the power supply voltage VT functions as a shield wire; thereby influence of noise due to capacitive coupling between neighboring signal lines can be made minimum.

Figure 21B:
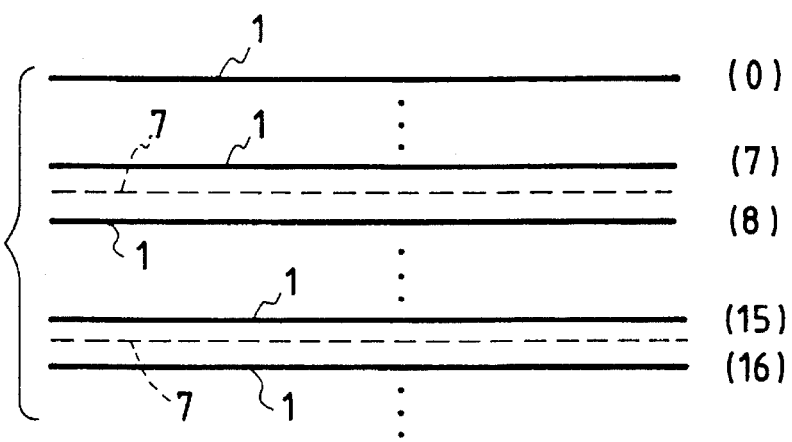
Figure 21C:
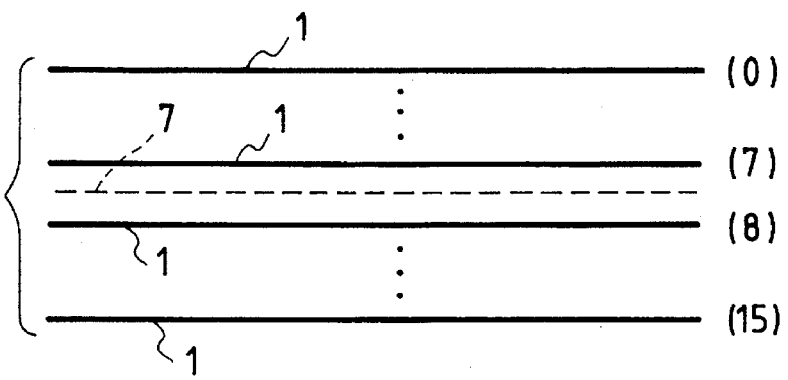
Figure 22:
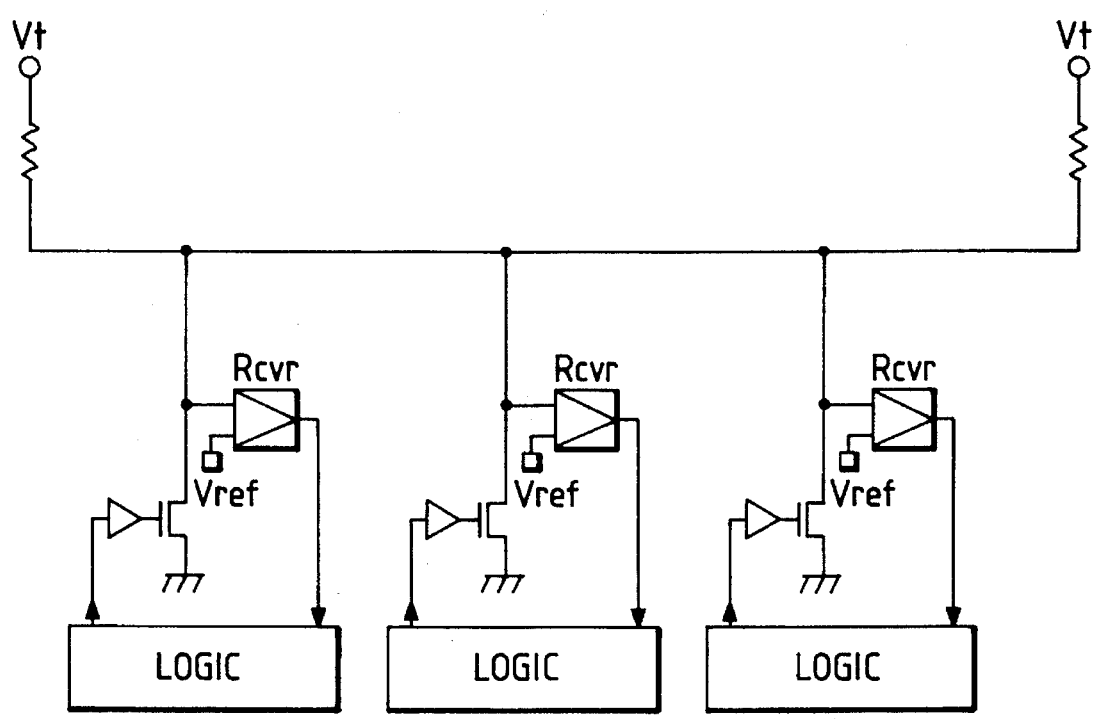
FIG. 22 is a circuit diagram explaining an example of the prior art (GTL).

FIG. 21(B) shows constitution that one reference line 2 is commonly used in every eight signal lines, and FIG. 21(C) shows constitution that one reference line 2 is commonly used in every 16 signal lines. In constitution of (B) and (C), if any one of the signal lines 1 commonly using the reference line 2 is subjected to switching noise of the drive transistor Q1 or the like, since the noise appears on the commonly used reference line 2 in the same phase, such noise component of the reference line 2 becomes undesirable component for an input circuit of a signal line being not subjected to the switching noise. However, since variation of such noise or peak value supplied to the reference line 2 commonly used by plural signal lines is made small in comparison with noise supplied to the reference line in one-to-one correspondence to the signal line, the number of the signal lines 1 commonly using one reference line 2 is suitably limited; thereby influence by the switching noise of the drive transistor Q1 or the like can be also eliminated.

Effects obtained from the above-mentioned embodiments are as follows.

(1) In method or constitution where one paired wiring traveling in parallel to a transmission path of a signal and a transmission path of reference voltage is, and a terminal end resistor matched with the characteristic impedance of the transmission path of the signal is connected to the terminal end voltage and a terminal end resistor matched with the characteristic impedance of of the transmission path of the reference voltage is connected to the terminal end voltage or the ground potential of the circuit, and in a transmitting circuit connected thereto, an output circuit of open drain is used and signal transmission is carried out, effect is obtained in that a transmitted signal can be made small amplitude corresponding to the terminal end voltage and the power consumption there can be reduced significantly.

(2) One paired wiring traveling in parallel to a transmission path of a signal and a transmission path of reference voltage is used, and a terminal end resistor matched with the characteristic impedance of the transmission path of the signal is connected to the terminal end voltage and a terminal end resistor matched with the characteristic impedance of the transmission path of the reference voltage is connected to the terminal end voltage or the ground potential of the circuit, and in a receiving circuit connected thereto, a differential input circuit with offset set to about ½ of the terminal end voltage is used; thereby since noise of common node appearing on the signal transmission path are canceled by the differential input circuit and moreover the reference voltage of high accuracy can be set by the offset, effect is obtained in that level margin sufficient to the signal of small amplitude can be taken.

(3) A series resistor is installed between the output terminal of the output circuit and the joint of the signal transmission path; therefore since disturbance of the characteristic impedance in the joint of the bus line is decreased, effect is obtained in that the voltage reflection at that point is decreased and high-speed signal transmission together with low-amplitude signal transmission can be carried out.

(4) An output circuit of open drain is used as the output circuit; thereby effect is obtained in that wired-OR logic can be taken, and a plurality of digital circuits respectively having differential sorts of power supply voltage are connected and signal transmission can be carried out mutually.

(5) Since the ground noise within the semiconductor integrated circuit generated due to the turn-on and the turn-off of the drive MOSFET is transmitted through the drive MOSFET to the signal line 1 and also transmitted through a switching MOSFET switch-controlled in synchronization with the drive MOSFET to the reference line 2, such ground noise can be put on the signal line 1 and the reference line 2 at the same phase, and since the same noise is put on the level of the signal line 1 and the reference line 2 transmitted to the input circuit, the noise can be canceled during differential amplification. Consequently, effect is obtained in that S/N of a signal to be transmitted can be improved and the high speed and the consumption power reduction can be intended by reduction of the signal amplitude.

(6) In the above-mentioned constitution (5), since the switch MOSFET transmitting the ground noise to the reference line in synchronization with the drive transistor is turned on at the output circuit only carrying out the signal transmission, effect is obtained in that the transmission of the ground noise to the ground potential can be prevented in the semiconductor integrated circuit other than the transmission side, including the semiconductor integrated circuit for the reception.

(7) In constitution that the reference line is terminated to the ground potential GND or the terminal en voltage VT, effect is obtained in that a circuit for generating the reference potential Vref onto the circuit board becomes unnecessary.

(8) When the reference potential Vref is supplied directly to the reference line 2, since a generating circuit of the reference potential Vref must be installed on the circuit board but special input offset need not be set in the input circuit, effect is obtained in that the coexistence with the GTL bus circuit installed already or the direct interface with the GTL bus circuit becomes possible.

(9) When the bus is constituted in one-to-one correspondence of the signal line 1 and the reference line 2, noise in the completely same phase is put on the signal line 1 and the reference line 2 of each output bit and function of carrying out the switching noise of the drive MOSFET can be completed. Also since the reference line 2 is interposed between all neighboring signal lines 1, effect is obtained in that the reference line 2 supplied with the ground potential GND or the terminal end voltage VT functions as a shield wire, and influence of noise due to capacitive coupling between neighboring signal lines can be made minimum.

(10) When the reference line 2 is commonly used by a plurality of signal lines 1 and the bus is constituted, effect is obtained in that margin of preventing the wrong operation due to the ground noise becomes small but the number of the reference lines can be decreased.

(11) The reference line 2 is supplied with the terminal end voltage VT as reference voltage and the offset voltage of the input circuit with respect to the terminal end voltage VT forms substantial reference voltage; thereby effect is obtained in that level margin can be secured when the terminal end voltage is varied significantly, and desirable level margin can be secured even when the setting width of the terminal end voltage is widened.

(12) The high-speed information processing section using the high-speed bus circuit and the low-speed information processing section using a conventional low-speed bus are mutually connected through an interface circuit and the system is constructed hierarchically; thereby effect is obtained in that information processing can be carried out efficiently in response to respective signal transmission speeds.

The invention done by the present inventors has been described specifically based on the embodiments. However, the present invention is not limited by the embodiments but may be variously modified and changed, of course, without departing the spirit and scope thereof. For example, the semiconductor integrated circuit constituting the signal transmission circuit need not always provided with both the output circuit and the input circuit of the embodiment, but this may be determined in response to function of individual semiconductor integrated circuits. Also the terminal end voltage or the reference potential of the signal line is not limited to the embodiment but may be changed suitably, and the input circuit is not limited to the circuit constitution of the embodiment. Also the conduction type of the drive transistor or the switching transistor is not limited to the embodiment but a bipolar transistor may be used here.

When a coupling capacitor is used as shown in the embodiment of FIG. 12 or FIG. 15, such a capacitor may be contained within the semiconductor integrated circuit. In this case, in order to obtain large capacitance value by small occupied area, a ferroelectric film may be utilized as a dielectric film. Or the semiconductor integrate circuit chip and the coupling capacitor may be moduled and enclosed in one package. In such constitution, the number of terminals per one bit may be made two.

The signal transmission circuit may be that used as a signal transmission circuit within one signal processing unit in a high-speed computer or the like. That is, it can be widely used in a circuit and system where length of the signal transmission path may be relatively short and the signal must be transmitted at low consumption power and high speed.

Effects obtained from representative invention disclosed in the present patent application will be briefly described as follows. In method or constitution where one paired wiring traveling in parallel to a transmission path of a signal and a transmission path of reference voltage is used, and a terminal end resistor matched with the characteristic impedance of the transmission path of the signal is connected to the terminal end voltage and a terminal end resistor matched with the characteristic impedance of the transmission path of the reference voltage is connected to the terminal end voltage or the ground potential of the circuit, and in a transmitting circuit connected thereto, an output circuit of open drain is used and signal transmission is carried out; thereby a transmission signal can be made small amplitude corresponding to the terminal end voltage and the power consumption there can be reduced significantly.

One paired wiring traveling in parallel to a transmission path of a signal and a transmission path of reference voltage is used, and a terminal end resistor matched with the characteristic impedance of the transmission path of the signal is connected to the terminal end voltage and a terminal end resistor matched with the characteristic impedance of the transmission path of the reference voltage is connected to the terminal end voltage or the ground potential of the circuit, and in a receiving circuit connected thereto, a differential input circuit with offset set to about ½ of the terminal end voltage is used; therefore since noises of common mode appearing on the signal transmission path are canceled by the differential input circuit and moreover the reference voltage of high accuracy can be set by the offset, level margin sufficient to the signal of the small amplitude can be taken.

A series resistor is installed between the output terminal of the output circuit and the joint of the signal transmission path; therefore since disturbance of the characteristic impedance in the joint of the bus line is decreased, the voltage reflection at that point is decreased and high-speed signal transmission together with low-amplitude signal transmission can be carried out.

An output circuit of open drain is used as the output circuit, thereby wired-OR logic can be taken, and a plurality of digital circuits respectively having different sorts of power supply voltages are connected and signal transmission can be carried out mutually.

Since the ground noise within the semiconductor integrated circuit generated due to the turn-on or the turn-off of the drive MOSFET is transmitted through the drive MOSFET to the signal line 1 and also transmitted through a switching MOSFET switch-controlled in synchronization with the drive MOSFET to the reference line 2, such ground noise can be put on the signal line 1 and the reference line 2 at the same phase, and since the same noise is put on the level of the signal line 1 and the reference line 2 transmitted to the input circuit, the noise can be canceled during differential amplification. Consequently, S/N of a signal to be transmitted can be improved an the high speed and the consumption power reduction can be intended by reduction of the signal amplitude.

In the above-mentioned constitution, since the switch MOSFET transmitting the ground noise to the reference line in synchronization with the drive transistor is turned on at the output circuit only carrying out the signal transmission, the transmission of the ground noise to the ground potential can be prevented in the semiconductor integrated circuit other than the transmission side, including the semiconductor integrated circuit for the reception.

In constitution that the reference line is terminated to the ground potential GND or the terminal end voltage VT, a circuit for generating the reference potential Vref onto the circuit board becomes unnecessary.

When the reference potential Vref is supplied directly to the reference line 2, since a generating circuit of the reference potential Vref must be installed on the circuit board but special input offset need not be set in the input circuit, the coexistence with the GTL bus circuit installed already or the direct interface with the GTL bus circuit becomes possible.

When the bus is constituted in one-to-one correspondence of the signal line 1 and the reference line 2, noise in the completely same phase is put on the signal line 1 and the reference line 2 of each output bit and function of canceling the switching noise of the drive MOSFET can be completed, and since the reference line 2 is interposed between all neighboring signal lines 1, the reference line 2 supplied with the ground potential GND or the terminal end voltage VT functions as a shield wire, an influence of noise due to capacitive coupling between neighboring signal lines can be made minimum.

When the reference line 2 is commonly used by a plurality of signal lines 1 and the bus is constituted, margin of preventing the wrong operation due to the ground noise becomes small but the number of the reference lines can be decreased.

The reference line 2 is supplied with the terminal end voltage VT as reference voltage and the offset voltage of the input circuit with respect to the terminal end voltage VT forms substantial reference voltage; thereby level margin can be secured when the terminal end voltage is varied significantly, and desirable level margin can be secured even when the setting width of the terminal end voltage is widened.

The high-speed information processing section using the high-speed bus circuit and the low-speed information processing section using a conventional low-speed bus are mutually connected through an interface circuit and the system is constructed hierarchically; thereby information processing can be carried out efficiently in response to respective signal transmission speeds.

What is claimed is:

1. A signal transmission circuit comprising:

a first signal transmission path supplied with terminal end voltage through a terminal end resistor for transmitting a data signal;

a second signal transmission path supplied with reference potential through a terminal end resistor and installed traveling in parallel to said first signal transmission path; and a first logic circuit connected to said first and second signal transmission paths and including a first input circuit having prescribed offset voltage, wherein said first input circuit includes a first input stage circuit having a first transistor supplied with the reference potential of said second signal transmission path and a second transistor supplied with the data signal transmitted from said first signal path, said first transistor and said second transistor carrying out differential operation by the offset voltage.

2. A signal transmission circuit according to claim 1, wherein the offset voltage is about ½ of that of the terminal end voltage.

3. A signal transmission circuit according to claim 2, further comprising:

a second logic circuit; and a first output circuit connected to said first signal transmission path for transmitting the data signal outputted from said second logic circuit to said first signal transmission path.

4. A signal transmission circuit according to claim 3, wherein said first output circuit includes a switching transistor having source-drain path connected between said first signal transmission path and a ground potential of said second logic circuit and switch-controlled by the data signal outputted from said second logic circuit.

5. A signal transmission circuit according to claim 4, further comprising:

a first resistor element connected between said first signal transmission path and said switching transistor.

6. A signal transmission path according to claim 5, further comprising:

a second resistor element connected between said second signal transmission path and the ground potential of said second logic circuit.

7. A signal transmission circuit according to claim 6, wherein said first logic circuit includes a second output circuit connected to said first signal transmission path for transmitting the data signal outputted from said first logic circuit to said first signal transmission path, and said second logic circuit includes a second input circuit connected to said first and second signal transmission paths and having the offset voltage, about ½ that of the terminal end and wherein said input circuit includes a second input stage circuit having a third transistor supplied with the reference potential of said second signal transmission path, and a fourth transistor supplied with the data signal transmitted from said first signal transmitted from said first signal transmission path, said third transistor and said fourth transistor carrying out differential operation by the offset voltage.

8. A signal transmission circuit according to claim 7, wherein said first and second signal transmission paths are transposed with prescribed intervals.

9. A signal transmission circuit according to claim 7, wherein said first and second logic circuits have different power supply voltage values respectively.

10. A signal transmission circuit according to claim 1, wherein said first and second signal transmission paths are transposed with prescribed intervals.

11. A signal transmission circuit according to claim 1, wherein the terminal end voltage and the reference voltage have the same potential.

12. A signal transmission circuit according to claim 11, wherein said first and second signal transmission paths are supplied with said potential from the same power supply terminal.

* * * * *

UNITED STATES PATENT AND TRADEMARK OFFICE
CERTIFICATE OF CORRECTION

PATENT NO. : 5,483,110
DATED : January 9, 1996
INVENTOR(S) : Kazuo Koide, et al.

It is certified that error appears in the above-indentified patent and that said Letters Patent is hereby corrected as shown below:

Claim 7, column 28, line 67, after "end" insert --voltage--.

Claim 7, column 29, line 1, before "input" insert --second--.

Signed and Sealed this

Seventh Day of May, 1996

Attest:

BRUCE LEHMAN

Attesting Officer

Commissioner of Patents and Trademarks